(12) United States Patent
Hemmi

(10) Patent No.: US 8,117,376 B2
(45) Date of Patent: Feb. 14, 2012

(54) STORAGE SYSTEM AND CONTROL METHOD THEREOF

(75) Inventor: Masateru Hemmi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 646 days.

(21) Appl. No.: 12/007,330

(22) Filed: Jan. 9, 2008

(65) Prior Publication Data

US 2008/0189466 A1    Aug. 7, 2008

(30) Foreign Application Priority Data

Feb. 6, 2007    (JP) ................................. 2007-026444

(51) Int. Cl.
*G06F 12/02* (2006.01)

(52) U.S. Cl. .. 711/103; 711/104; 711/165; 711/E12.002
(58) Field of Classification Search ............... 711/4, 103
See application file for complete search history.

(56) References Cited

U.S. PATENT DOCUMENTS

| | | | |
|---|---|---|---|
| 5,469,390 A | 11/1995 | Sasaki et al. | |
| 5,680,579 A * | 10/1997 | Young et al. | 711/157 |
| 5,859,960 A | 1/1999 | Kurihara et al. | |
| 2004/0148544 A1 | 7/2004 | Higaki et al. | |
| 2005/0044454 A1 * | 2/2005 | Moshayedi | 714/54 |
| 2006/0236198 A1 * | 10/2006 | Lintz et al. | 714/758 |
| 2007/0283079 A1 | 12/2007 | Iwamura et al. | |

FOREIGN PATENT DOCUMENTS

| | | |
|---|---|---|
| EP | 0 530 554 A2 | 8/1992 |
| EP | 0 530 554 | 3/1993 |
| JP | 7-085691 | 3/1995 |
| JP | 07-152502 | 6/1995 |
| JP | 2000-011677 | 1/2000 |
| JP | 2000-207137 | 7/2000 |
| JP | 2004-021811 | 6/2002 |
| JP | 2003-323352 | 11/2003 |
| JP | 2004-213684 | 7/2004 |

OTHER PUBLICATIONS

Extended European Search Report dated Jun. 3, 2008.

* cited by examiner

*Primary Examiner* — Kenneth Lo
(74) *Attorney, Agent, or Firm* — Foley & Lardner LLP

(57) ABSTRACT

Proposed are a storage system and its control method capable of dealing with the unique problems that arise when using a nonvolatile memory as the memory device while effectively preventing performance deterioration. This storage system is provided with a plurality of memory modules having one or more nonvolatile memory chips, and a controller for controlling the reading and writing of data from and in each memory module. The memory module decides the nonvolatile memory chip to become a copy destination of data stored in the nonvolatile memory when a failure occurs in the nonvolatile memory chip of a self memory module, and copies the data stored in the failed nonvolatile memory chip to the nonvolatile memory chip decided as the copy destination.

13 Claims, 36 Drawing Sheets

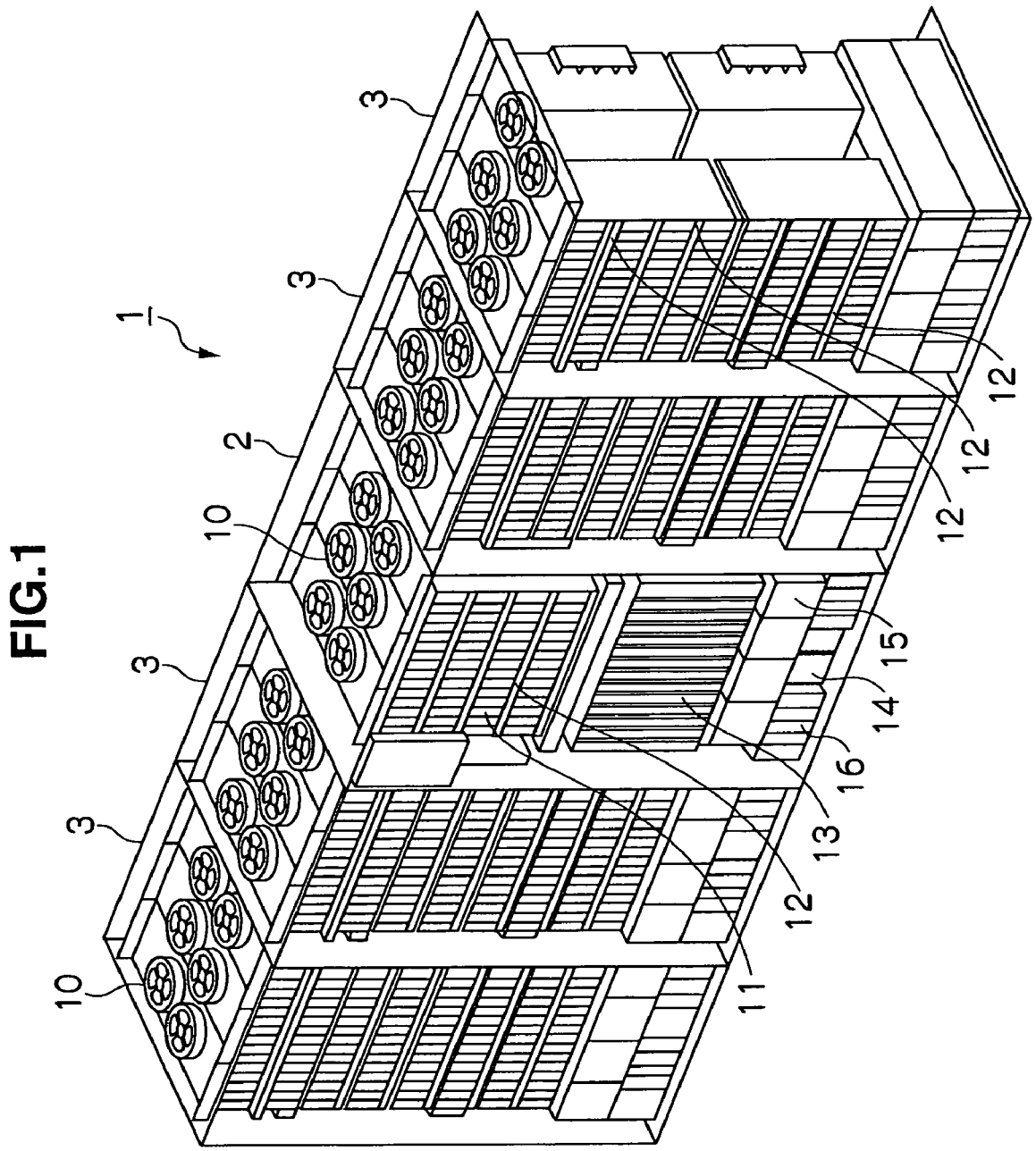

FIG.9

| | | | | | | | | | |
|---|---|---|---|---|---|---|---|---|---|
| HOST | LUN | 1 | | | | 2 | | | ... 64A1 |
| | LBA | 0-11999 | | | | 12000-23999 | | | ... 64A2 |
| FM ADAPTER | LDEV NUMBER | 1 | | | | 2 | | | ... 64B1 |
| | INTERNAL LBA | 0-11999 | | | | 12000-23999 | | | ... 64B2 |
| | FM MODULE NUMBER | 1 | 2 | 3 | 4 | 5 | 6 | 7 | 8 ... 64B3 |
| | FM MODULE INTERNAL LBA | 0-3999 | 0-3999 | 0-3999 | 0-3999 | 4000-7999 | 4000-7999 | 4000-7999 | 4000-7999 ... 64B4 |

FIG.11

| STATUS OF SPARE FM CHIP | FM CHIP # | FAILURE BLOCK COUNT THRESHOLD VALUE | FAILURE BLOCK COUNT | ERROR FLAG | STATUS OF RAID CONFIGURATION | STATUS |
|---|---|---|---|---|---|---|
| YES (SPARE FM CHIP = #n-2, n-1, n) | 1 | 100 | 0 | 0 | YES (RAID GROUP 1) | ALLOCATED |
| | 2 | 100 | 1 | 0 | YES (RAID GROUP 1) | ALLOCATED |
| | 3 | 100 | 0 | 0 | YES (RAID GROUP 1) | ALLOCATED |
| | ... | ... | ... | ... | ... | ... |
| | n-1 | 100 | 0 | 0 | NO | ALLOCATED |
| | n | 100 | 0 | 0 | NO | ALLOCATED |
| 70A | 70B | 70C | 70D | 70E | 70F | 70G |

| STATUS OF SPARE BLOCK | BLOCK ADDRESS | WRITE COUNT THRESHOLD VALUE | WRITE COUNT | ERROR COUNT THRESHOLD VALUE | ERROR COUNT | ERROR FLAG |
|---|---|---|---|---|---|---|
| YES (SPARE BLOCK ADDRESS = #m-3, m-2, m-1, m) | 1 | 100000 | 1121 | 30 | 0 | 0 |
| | 2 | 100000 | 1122 | 30 | 1 | 0 |
| | 3 | 100000 | 1121 | 30 | 0 | 0 |
| | ... | ... | ... | ... | ... | ... |
| | m-1 | 100000 | 0 | 30 | 0 | 0 |
| | m | 100000 | 0 | 30 | 0 | 0 |
| 71A | 71B | 71C | 71D | 71E | 71F | 71G |

STORAGE SYSTEM AND CONTROL METHOD THEREOF

CROSS REFERENCES

This application relates to and claims priority from Japanese Patent Application No. 2007-026444, filed on Feb. 6, 2007, the entire disclosure of which is incorporated herein by reference.

BACKGROUND

The present invention generally relates to a storage system and its control method, and, for instance, can be suitably applied to a storage system adopting a flash memory as its memory device.

Conventionally, a semiconductor memory or a hard disk drive is used as the memory device in a storage system. A semiconductor memory boasts such benefits as fast access speed, compact size, low power consumption and high reliability, but also has a drawback in that the cost per unit bit is expensive. Meanwhile, a hard disk drive has drawbacks in comparison to a semiconductor memory such as slow access speed, bulky size, high power consumption and low reliability, but is advantageous in that the cost per unit bit is dramatically cheaper than a semiconductor memory.

Thus, in recent years, hard disk drives have become mainstream as the memory device in a storage system, and technological innovation relating to hard disk drives has accelerated. As a result, the storage capacity per unit area in a hard disk drive has increased by leaps and bounds.

In addition, reliability, which was the weak point of hard disk drives, has improved due to the application of RAID (Redundant Array of Inexpensive Disks) technology, and in recent years a large-scale storage system with a capacity of several TB has appeared in the market.

Meanwhile, in recent years, a flash memory as a semiconductor device enabling the free rewriting of data and which retains data even when the power is turned off is being widely used as a memory device. Pursuant to the diffusion of this flash memory, the cost per unit bit of flash memories is coming down.

Under the foregoing circumstances, it is anticipated that a storage apparatus equipped with a flash memory as the memory device will hit the streets in the future. By adopting the foregoing configuration, it is assumed that a storage apparatus with fast access speed and low power consumption can be realized.

Incidentally, Japanese Patent Laid-Open Publication No. 2004-21811 proposes a storage that consolidates a flash memory and a hard disk drive.

SUMMARY

Nevertheless, a flash memory is only able to guarantee a write cycle of roughly 100,000 times. Thus, when adopting a flash memory as the memory device in a storage system, it is anticipated that the data migration between memory devices will be frequently conducted in view of the foregoing restriction in the write cycle of a flash memory. Incidentally, when giving consideration to the capacity per chip of the flash memory, a storage adopting a flash memory may need to be equipped with an enormous number of memory chips.

Nevertheless, when controlling the data migration between the memory devices with a controller of the storage system, the controller load will increase, and there is a possibility that this may have an adverse effect such as deteriorating the performance of other processing such as the data I/O processing in the storage system.

The present invention was made in view of the foregoing points. Thus, an object of the present invention is to propose a storage system and its control method capable of dealing with these unique problems that arise when using a nonvolatile memory as the memory device while effectively preventing performance deterioration.

In order to achieve the foregoing object, the present invention provides a storage system for providing a storage extent for reading and writing data from and in a host system. This storage system comprises a plurality of memory modules having one or more nonvolatile memory chips for respectively providing the storage extent, and a controller for controlling the reading and writing of data from and in each of the memory modules. The memory module decides the nonvolatile memory chip to become a copy destination of data stored in the nonvolatile memory when a failure occurs in the nonvolatile memory chip of a self memory module, and copies the data stored in the failed nonvolatile memory chip to the nonvolatile memory chip decided as the copy destination.

The present invention additionally provides a control method of a storage system for providing a storage extent for reading and writing data from and in a host system. The storage system comprises a plurality of memory modules having one or more nonvolatile memory chips for respectively providing the storage extent, and a controller for controlling the reading and writing of data from and in each of the memory modules. The control method comprises a first step of the memory module deciding the nonvolatile memory chip to become a copy destination of data stored in the nonvolatile memory when a failure occurs in the nonvolatile memory chip of a self memory module, and a second step of the memory module copying the data stored in the failed nonvolatile memory chip to the nonvolatile memory chip decided as the copy destination.

According to the present invention, it is possible to realize a storage system and its control method capable of dealing with these unique problems that arise when using a nonvolatile memory as the memory device while effectively preventing performance deterioration.

DESCRIPTION OF DRAWINGS

FIG. 1 is a diagrammatic perspective view showing the external configuration of a storage system according to an embodiment of the present invention;

FIG. 9 is a conceptual diagram showing a first address conversion table;

FIG. 11 is a conceptual diagram showing a chip management table;

FIG. 12 is a conceptual diagram showing a block management table;

DETAILED DESCRIPTION

Figure 2C:
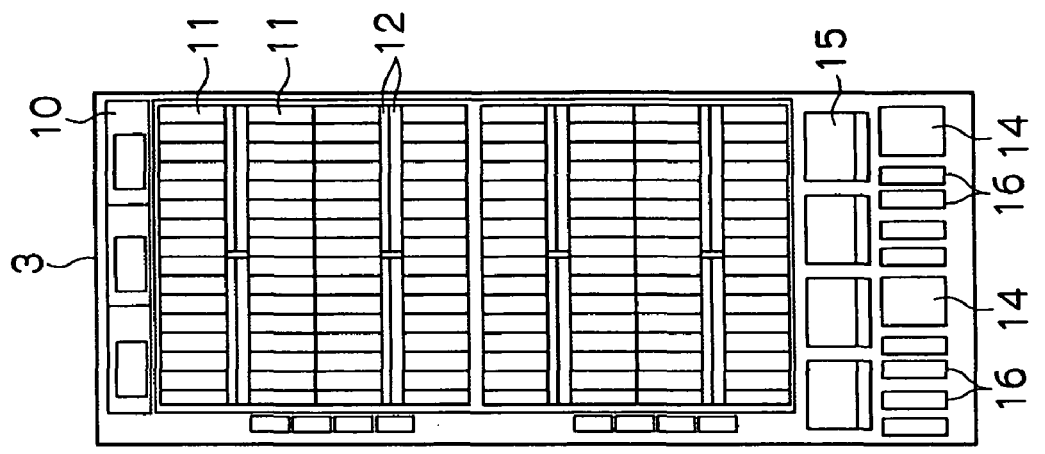
FIG. 2C is a rear view showing the rear face configuration of the storage apparatus.

An embodiment of the present invention is now explained in detail with reference to the attached drawings.

(1) First Embodiment (1-1) Configuration of Storage System in Present Embodiment (1-1-1) External Configuration of Storage System FIG. 1 shows an overall storage system 1 according to an embodiment of the present invention. The storage system 1 is configured from a storage control apparatus 2 for controlling the input and output of data, and a plurality of storage apparatuses 3 arranged on either side of the storage control apparatus 2.

The storage control apparatus 2 is configured by housing one or more cooling fan units 10, FM (Flash Memory) modules 11, PBC (Port Bypass Circuit) boards 12, logical substrates 13, AC boxes 14, power source modules 15 and batteries 16 inside a rectangular-shaped storage control apparatus case.

The cooling fan unit 10 is a unit having one or more fans built therein, and used for discharging the heat arising in the FM module 11 and the logical substrate 13 and so on outside the storage control apparatus case.

Figure 4A:
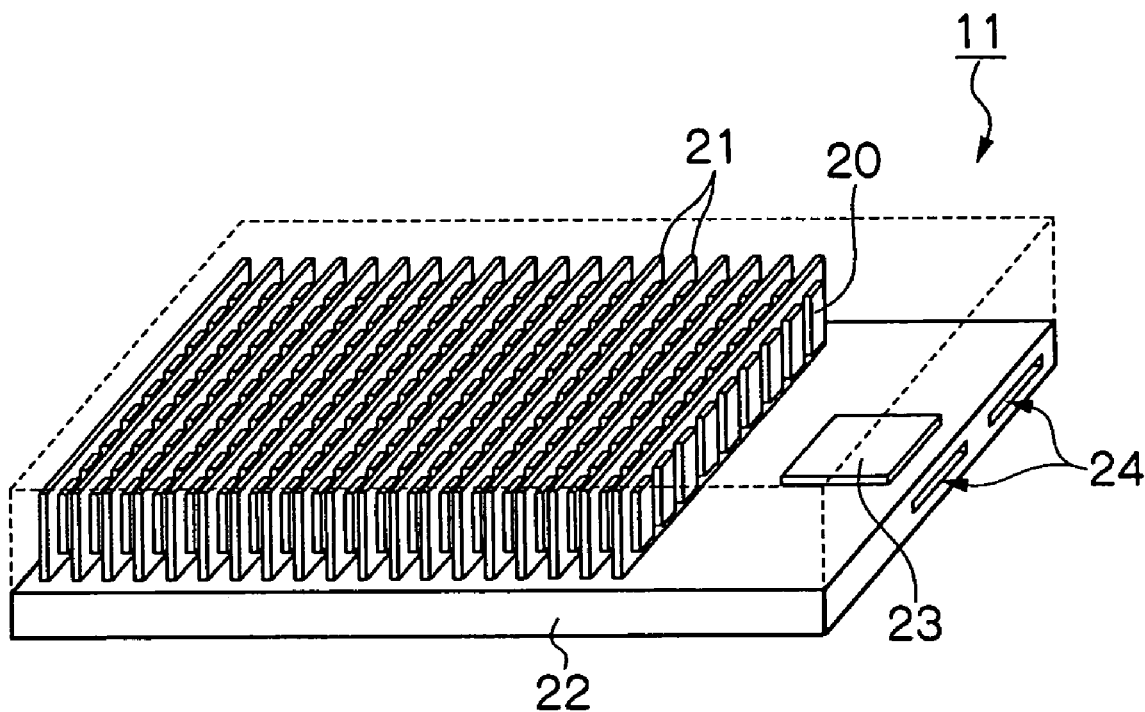
FIG. 4A is a diagrammatic perspective view showing the internal configuration of the FM module according to an embodiment of the present invention.

The FM module 11, for instance, as shown in FIG. 4A, is configured by a plurality of flash memory units 21 respectively mounted with a plurality of FM chips 20 being replaceably mounted on a base board 22 of a prescribed size. An FM control LSI (Large Scale Integration circuit) 23 is mounted at the back-end side of this base board 22, and the data I/O processing unit 40 (FIG. 7) described later formed in the FM control LSI 23 controls the input and output of data to and from each FM chip 20 in the FM module 11.

Further, a connector 24 is provided to the back-end side of the FM module 11, and, by engaging this connector with a connector in a motherboard not shown arranged in the storage control apparatus 2, the FM module 11 can be physically and electrically connected to the motherboard.

Figure 4B:
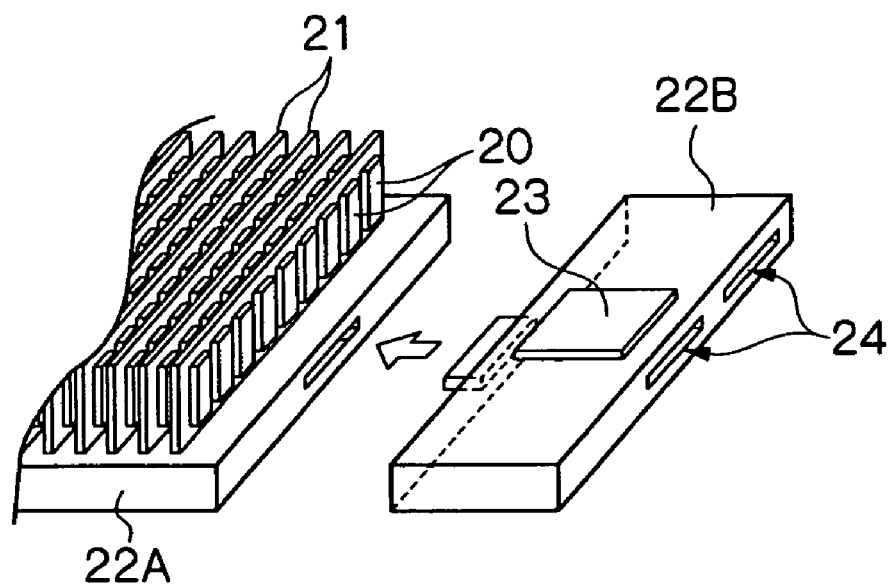
FIG. 4B is a schematic diagram showing a modified example thereof.

Incidentally, the base board 23, as shown in FIG. 4B, may also be configured so that the back-end portion 23B mounted with the FM control LSI 23 can be freely attached and detached to and from the base board main body 23A. Thereby, when a failure occurs in the FM control LSI 23, it will be easy to replace the FM control LSI 23.

The PBC board 12 comprises a communication path for electrically connecting each FM module 11 mounted on the same level in the storage control apparatus 2. As shown in FIG. 3B, an FC (Fibre Channel) loop 25 (FIG. 5) described later is formed by a plurality of FM modules 11 being connected serially and communicably via the PBC board 12.

The logical substrates 13 are configured from a channel adapter 33, a data transfer controller 34, a cache memory 35, a local memory 36, a microprocessor 37, an FM adapter 38 and the like described later with reference to FIG. 6. These logical substrates 13 are removeably connected to a backboard (not shown) disposed in the storage control apparatus 2 so as to enable communication with the other logical substrates 13 mounted in the storage control apparatus 2 via the backboard.

The AC box 14 is the intake of commercial AC power to the storage system 1, and functions as a breaker. The commercial AC power that entered the AC box 14 is supplied to the power source module 15. The power source module 15 converts the commercial AC power provided from the AC box 14 into DC power, and supplies this to the logical substrates 13, FM modules 11, cooling fans 10 and the like.

Further, the batteries 16 are used as a backup power source for supplying power to the respective components inside the storage control apparatus 2 during a power failure or malfunction of the power source module 15.

Figure 2B:
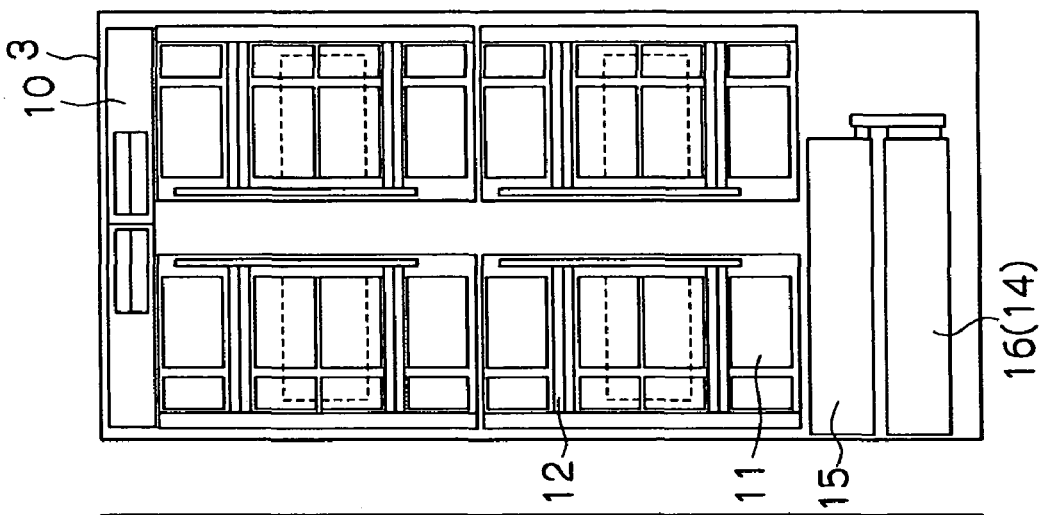
FIG. 2B is a perspective view showing the internal configuration of the storage apparatus from the side.
Figure 2A:
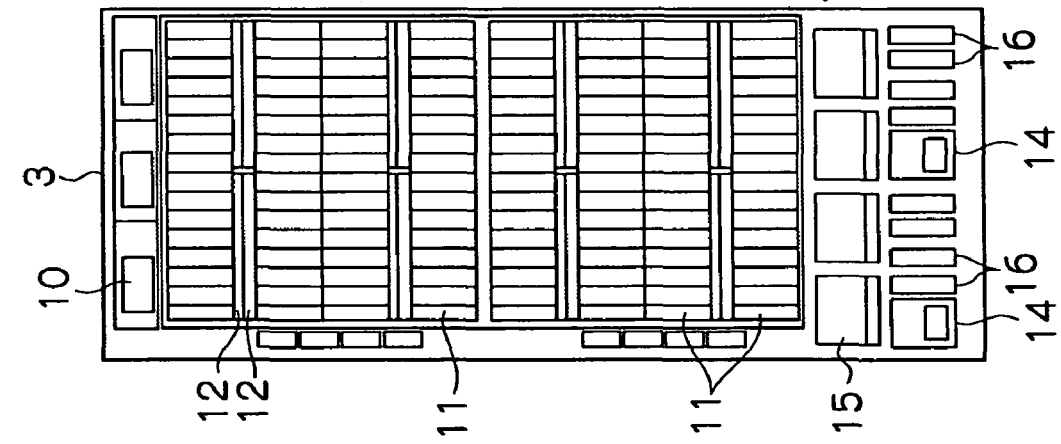
FIG. 2A is a front view showing the front face configuration of the storage apparatus.

Meanwhile, the storage apparatus 3, as shown in FIG. 1 and FIG. 2, is configured by housing a plurality of cooling fan units 10, FM modules 11, PBC boards 12, AC boxes 14, power source modules 15 and batteries 16 in the storage apparatus case, respectively. The cooling fan units 11 and the like are the same as the cooling fan units 11 and the like of the foregoing storage control apparatus 2, and the explanation thereof is omitted.

Figure 3A:
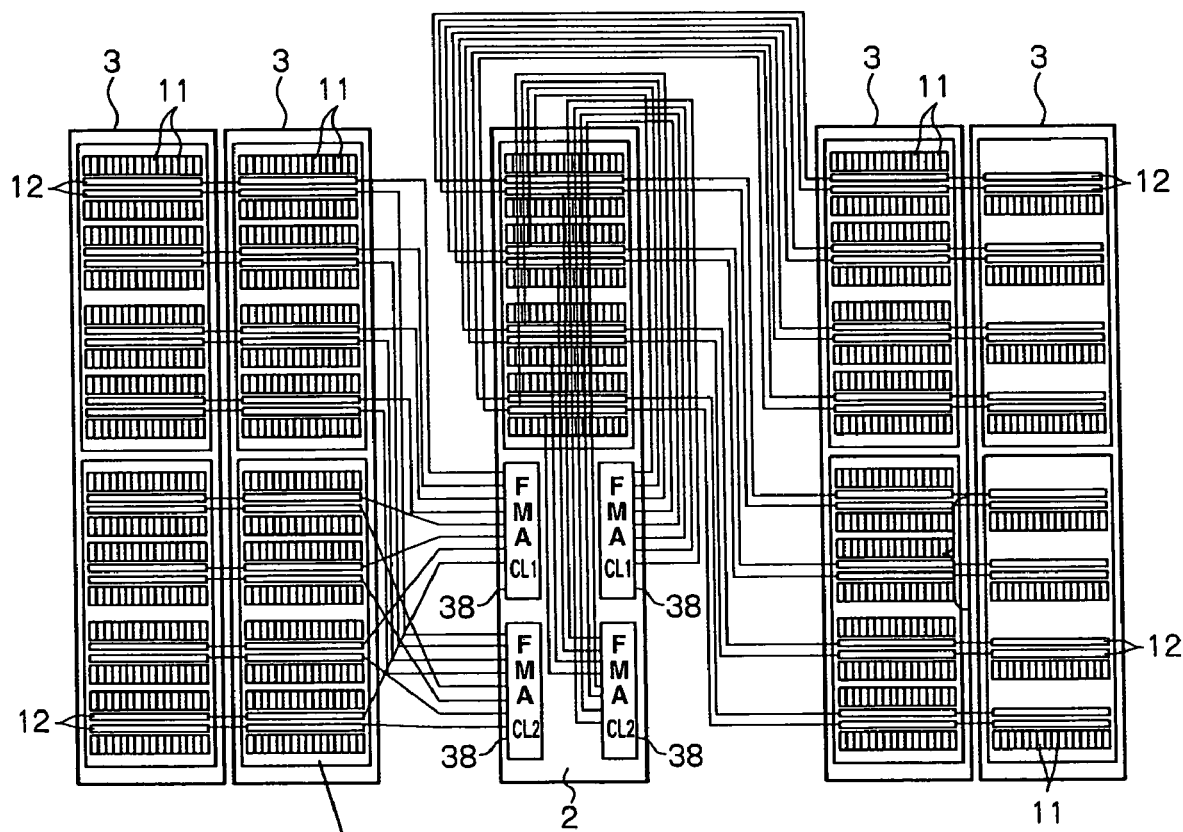
FIG. 3A is a conceptual diagram showing a connection configuration of the storage system according to an embodiment of the present invention.
Figure 3B:
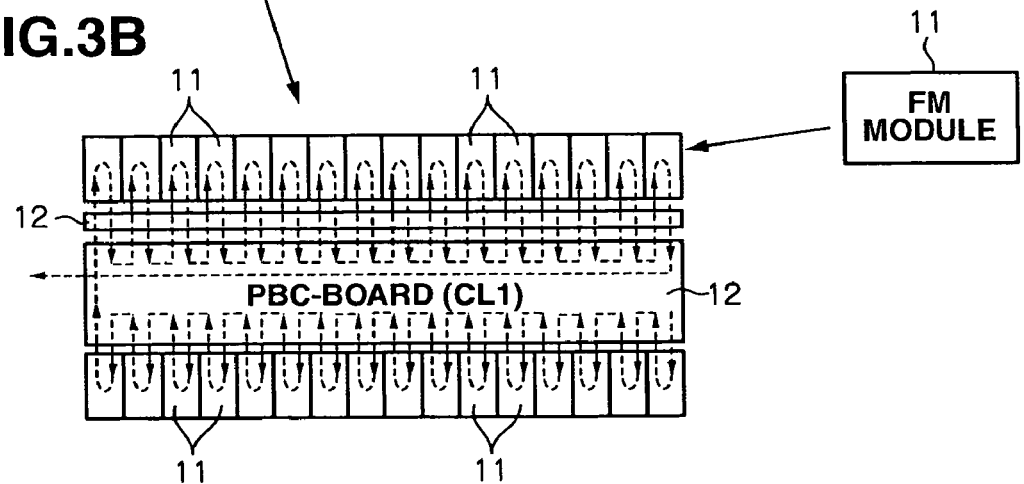
FIG. 3B is a conceptual diagram showing the connection configuration between the FM modules via a PBC board.

FIG. 3A shows a configuration of the connection between the storage control apparatus 2 and each storage apparatus 3. The storage control apparatus 2 is provided with a plurality of logical substrates 13 with an FM adapter 38 (refer to FIG. 6) formed thereon. Two of these FM adapters 38 configure one cluster, and the access line to each FM module 11 will be duplexed thereby. As a result, even when a failure occurs to one FM adapter 38 and it is not possible to access the FM module 11 containing such FM adapter 38, it will be possible to access that FM module 11 from the other FM adapter 38.

Two or more PBC boards 12 among the PBC boards 12 mounted on the storage control apparatus 2 or the storage apparatus 3 are connected serially via an FC cable. The top PBC board 12 among the two or more PBC boards 12 connected serially is connected, via the FC cable, to the logical substrate 13 to which the FM adapters 38 are formed thereon. Thereby, as shown in FIG. 5, an FC loop 25 according to the FC-AL (Fiber Channel Arbitrated Loop) standard is formed.

Figure 5:
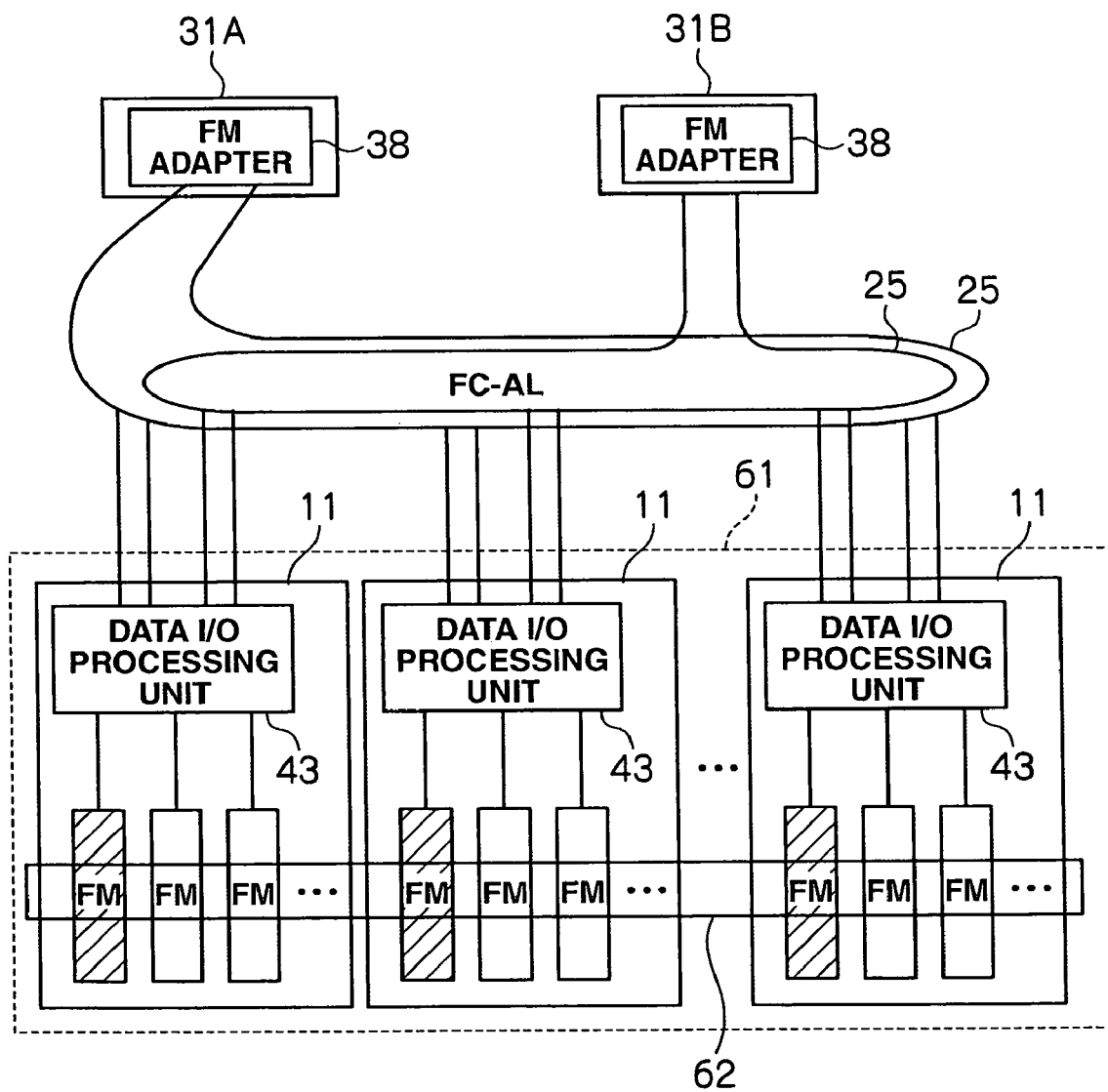
FIG. 5 is a conceptual diagram explaining an FC loop.

The storage apparatus 3 is provided with a plurality of FC loops 25, and, as shown in FIG. 5, a plurality of FM modules 11 are connected to each FC loop 25. Each FM module 11 is able to access a desired FM module 11 among the plurality of FM modules 11 connected to the FC loop 25 to which it is connected.

(1-1-2) Internal Configuration of Storage System

Figure 6:
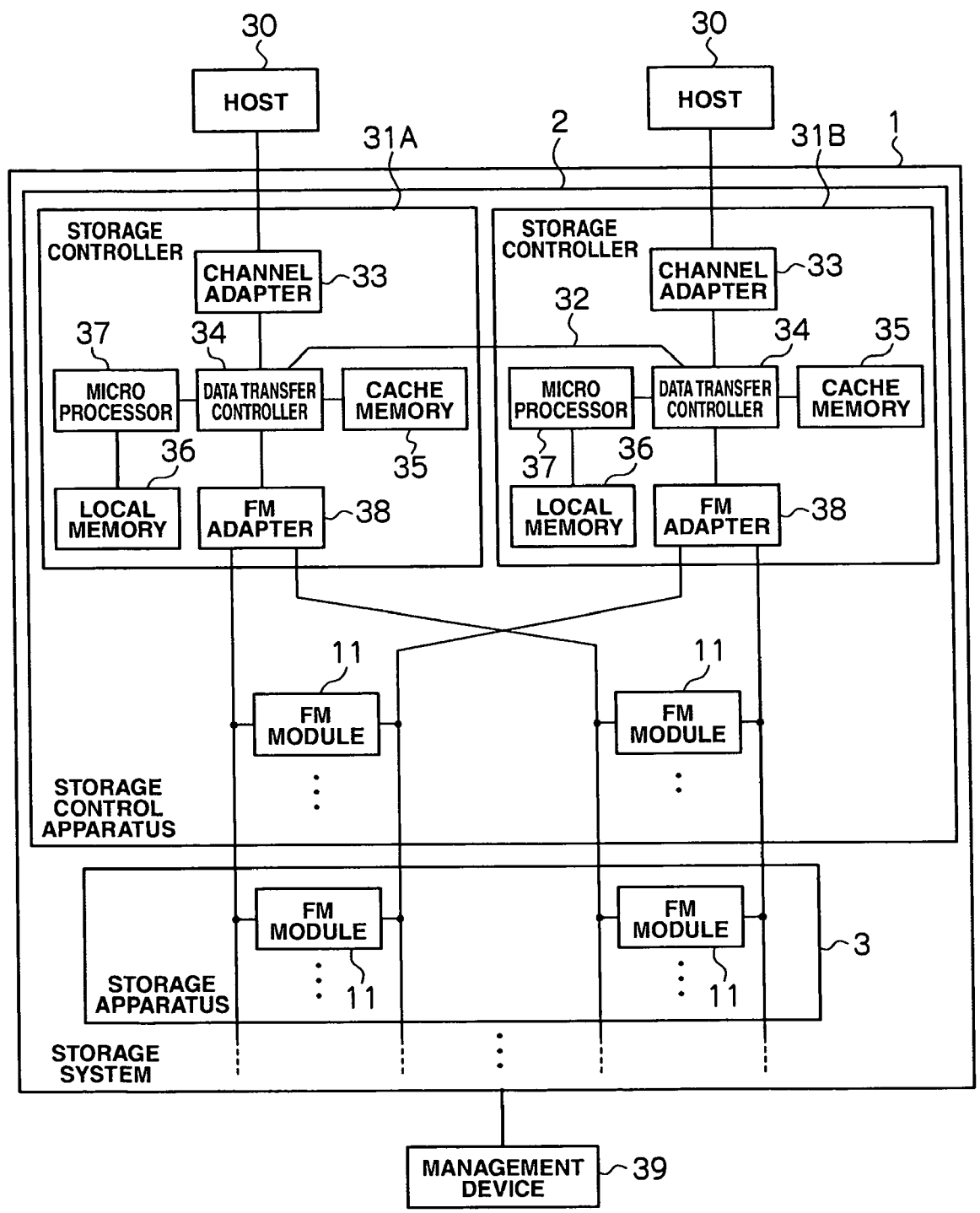
FIG. 6 is a block diagram showing the internal configuration of the storage system according to an embodiment of the present invention.

FIG. 6 shows the internal configuration of the storage system 1. As shown in FIG. 6, the storage control apparatus 2 is configured from 0-system and 1-system storage controllers 31A, 31B respectively connected to different host systems 30, an inter-controller connection path 32 for connecting these storage controllers 31A, 31B in a communicable state, and a plurality of FM modules 11.

As the inter-controller connection path 32, for instance, a bus based on a PCI (Peripheral Component Interconnect)-Express standard for realizing high-speed data communication where the data transfer volume per direction of one lane (maximum of 8 lanes) is 2.5 [Gbit/sec] is used. The transfer of data and various pieces of information between the 0-system and 1-system storage controller 31A, 31B as described above is all conducted via the inter-controller connection path 32.

Each storage controller 31A, 31B has the function of controlling the reading and writing of data from and in the corresponding FM chip 20 (FIG. 20) in the FM module 11 mounted on the storage control apparatus 2 or the storage apparatus 3 according to a request from the host system 30 to which it is connected, respectively. Each storage controller 31A, 31B comprises a channel adapter 33, a data transfer controller 34, a cache memory 35, a local memory 36, a microprocessor 37, an FM adapter 38, and the like.

The channel adapter 33 functions as an interface with the host system 30 and comprises one or more communication ports. The communication ports are used for connecting the storage controllers 31A, 31B to a network or the host system 30, and, for instance, are respectively allocated with a unique network address such as an IP (Internet Protocol) address or a WWN (World Wide Name).

Further, the channel adapter 33 performs protocol control during the communication with the host system 30. Based on the protocol control function of the channel adapter 33, data and commands are sent and received between the host system 30 and the storage systems 33A, 33B according to an FC protocol, iSCSI protocol, TCP/IP (Transmission Control Protocol/Internet Protocol) protocol, or the like.

The data transfer controller 34 has the function of controlling the data transfer between the 0-system and 1-system storage controllers 31A, 31B, and the data transfer between the respective elements in the 0-system or 1-system storage controller 31A, 31B. Further, the data transfer controllers 34A, 34B have a function of duplexing the write-target data provided from the host system 30 in the cache memory 35 based on a command from the self-system microprocessor 37. Specifically, when the 0-system or 1-system microprocessor 37 stores data in the self-system cache memory 35, this data is also written in the cache memory 35 of another system (dual writing).

The cache memory 35, for instance, is configured from a volatile memory such as an SDRAM (Synchronous Dynamic Random Access Memory), and is primarily used for temporarily storing data to be read from and written into the FM module 11. Moreover, the local memory 36 is used for storing various control programs, and as a work memory of the microprocessor 37.

The microprocessor 37 has a function of governing the overall operational control of the respective self-system storage controllers 31A, 31B. The various processing routines to be performed by the microprocessor 37 are conducted according to the control programs stored beforehand in the local memory 36.

The FM adapter 38 is configured as a microcomputer system comprising a CPU, a memory and the like, and functions as an interface that performs protocol control during the communication with the FM module 11. In the present embodiment, an existing disk adapter for communicating with existing hard disk drives is used as the FM adapter 38 instead of an adapter that is designed for a flash memory.

Incidentally, the management unit 39 is a computer device that is operated for the maintenance and management of the storage system 1, and, for instance, is configured from a laptop personal computer. The maintenance management unit 39 is able to monitor the occurrence of a failure in the storage system 1 and display such failure on a display screen (not shown), or command the block processing of the FM module 11 based on a command from the host system 30.

Figure 7:
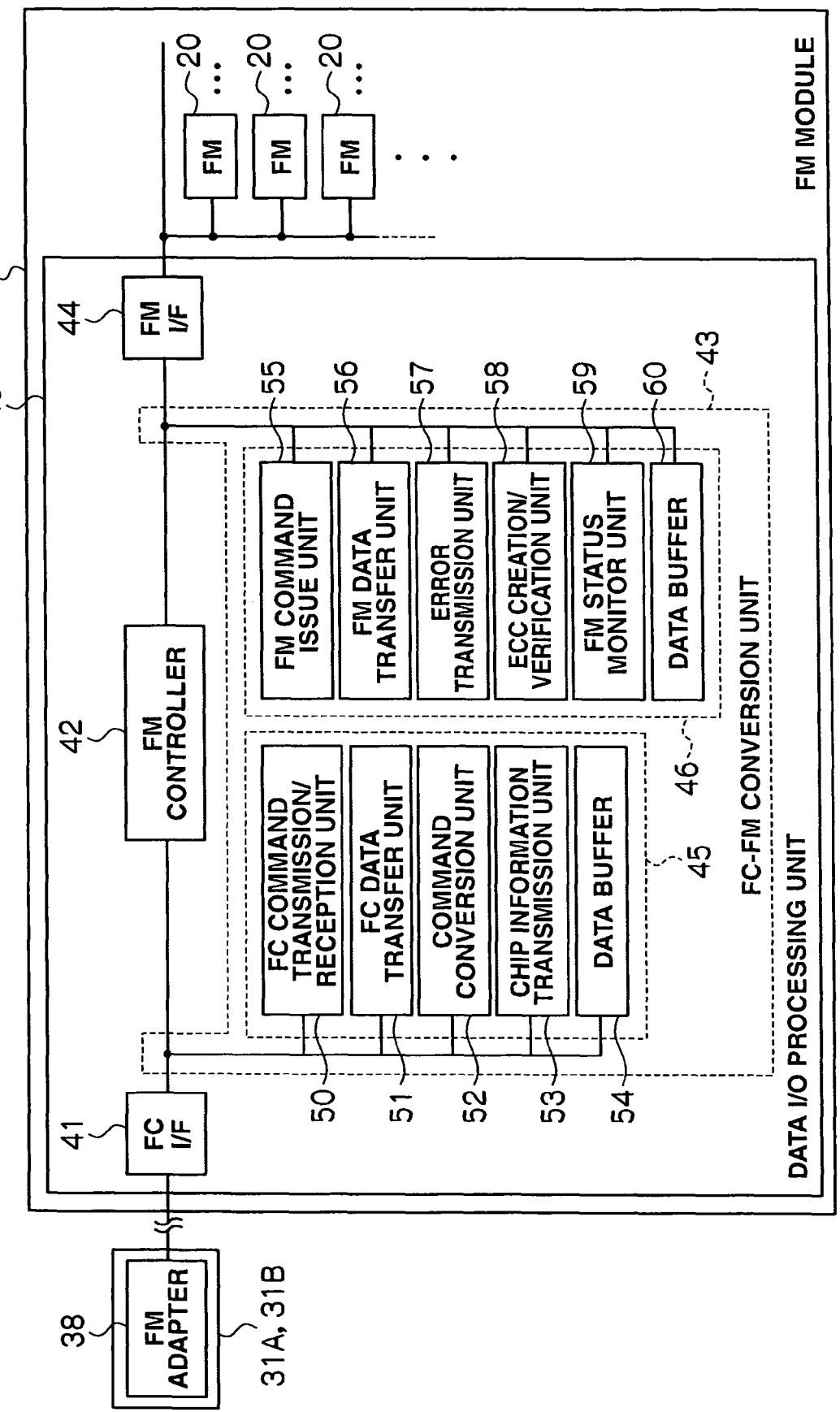
FIG. 7 is a block diagram showing the configuration of a data I/O processing unit of an FM module.

The FM module 11, as shown in FIG. 7, is configured by comprising a data I/O processing unit 40 formed in the FM control LSI 23 (FIG. 4), and a plurality of FM chips 20.

The data I/O processing unit 40 comprises an FC interface unit 41, an FM controller 42, an FC-FM converter 43, and an FM interface unit 44.

The FC interface unit 41 is an interface between the storage controllers 31A, 31B of the storage control apparatus 2 explained with reference to FIG. 6, and the FM interface unit 44 is an interface between the FM chips 20 housed in the FM module 11. Further, the FM controller 42 functions as a processor that governs the overall operational control of the FM module 11.

The FC-FM converter 43 is an interface for connecting the FM adapter 38 and the FM module 11 of the storage controllers 31A, 31B, and is configured from an FC-side conversion processing unit 45 connected between the FM interface unit 41 and the FM controller 42, and an FM-side conversion processing unit 46 connected between the FM controller 42 and the FM interface unit 44.

Among the above, the FC-side conversion processing unit 45 comprises an FC command transmission/reception unit 50, an FC data transfer unit 51, a command converter 52, a chip information transmission unit 53, and a data buffer 54.

The FC command transmission unit 50 of the FC-side conversion processing unit 45 has a transmission function of sending an FC protocol command to the FM adapter 38 via the FC loop 25 (FIG. 5), and an initiator function of functioning as an initiator during the copying of data. Further, the FC data transfer unit 51 sends and receives data between the FM adapter 38 and another FM module 11 via the FC loop 25.

Moreover, the command converter 52 protocol converts the received command based on the FC protocol into an FM command, or protocol converts the FM command into a command based on the FC protocol.

The chip information transmission unit 53 has a function of sending block address information and the like to the FM adapter 38 during or after the data copy between the FM chips 20 as described later. The data buffer 54 is a memory to be used for temporarily storing data that passes through the FC interface unit 41 and the FM controller 42.

Further, the FM-side conversion processing unit 46 comprises an FM command issue unit 55, an FM data transfer unit 56, an error transmission unit 57, an ECC (Error Correction Code) creation/verification unit 58, an FM status monitor unit 59, and a data buffer unit 60.

The FM command issue unit 55 has a function of issuing in parallel to the FM chip 20 various commands based on flash memory standards, and the FM data transfer unit 56 has a function of sending and receiving in parallel data to be read and written between the respective FM chips 20.

Further, the error transmission unit 57 has a function of notifying the FM adapter 38 of the storage controllers 31A, 31B when an error occurs in the FM module 11, and the ECC creation/verification unit 58 has a function of performing creation processing or verification processing of ECC during the reading and writing of data from and in the FM chip 20.

Moreover, the FM status monitor unit 59 monitors the status (status of failure or operation) for each FM chip 20 in the FM module 11. The data buffer 60 is used for temporarily storing the data to be read and written from and in the FM chip 20 of the FM module 11.

Figure 8:
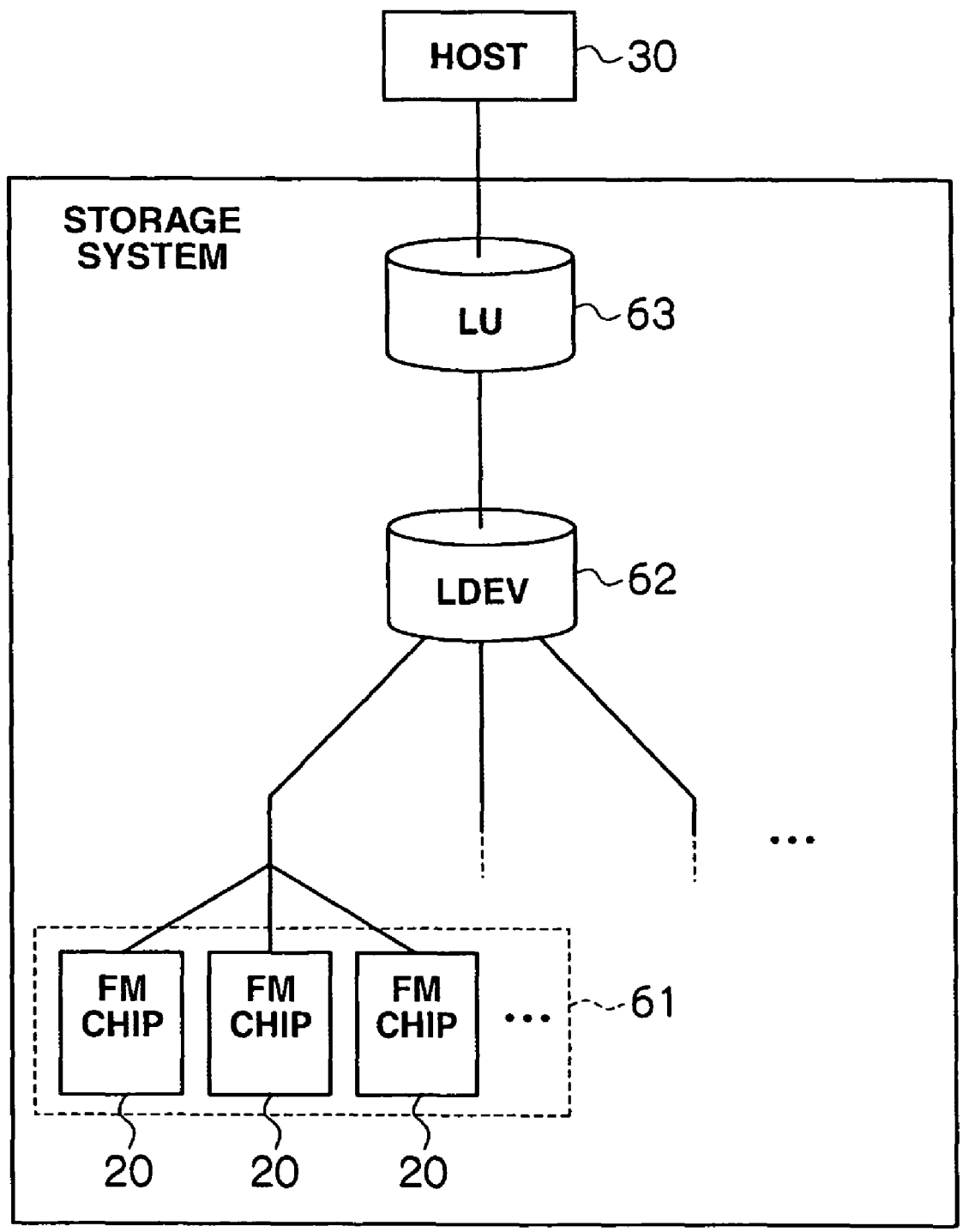
FIG. 8 is a conceptual diagram explaining the correspondence between storage extents provided by a logical unit, LDEV and FM chip.

The FM chip 20 is a non-rewritable nonvolatile semiconductor memory chip. The FM chip 20 is operated under the RAID system by the storage controllers 31A, 31B. As shown in FIG. 5 and FIG. 8, one RAID group 61 is formed from one or more FM chips 20 existing in one FM module 11, or from a plurality of FM chips 20 existing across a plurality of FM modules 11, and one or more LDEVs (Logical Devices) 62 as logical storage extents are formed on a physical storage extent provided by each FM chip 20 in the RAID group 61.

Further, each LDEV 62 is associated with a logical unit 63 formed from a virtual logical volume to be provided to the host system 30 by the respective storage controllers 31A, 31B. As the correspondence in the foregoing case, as shown in FIG. 8, in addition to the case where one LDEV 62 is associated with one logical unit 63, there are cases where a plurality of LDEVs 62 are associated with one logical unit 63, or a plurality of logical units 63 are associated with one LDEV 62.

A unique identification number (LUN: Logical Unit Number) is allocated to each logical unit 63. Further, the storage extent in the logical unit 63 is managed in logical block units of a prescribed size, and a unique identification number (LBA: Logical Block Address) is allocated to each block. The input and output of data to and from the logical unit 63 is conducted by making the combination of such LUN and LBA the address, and designating this address.

Thus, the FM adapter 38 (FIG. 6) of the storage controllers 31A, 31B has a first address conversion table 64 as shown in FIG. 9 in an internal memory not shown, or in the local memory 36.

The first address conversion table 64 is a table for managing the correspondence of the LBA in the logical unit 63 recognized by the host system 30, and the identification number (LDEV number) of the LDEV 62, LBA in the LDEV 62, identification number (FM module number) of the FM module 11 that provides the storage extent configuring the LDEV 62, and LBA in the FM module 11, and is configured from a "host system" column 64A and an "FM adapter" column 64B.

The "host system" column 64A is configured from an "LUN" column 64A1 and an "LBA" column 64A2. The "LUN" column 64A1 stores the LUN of each logical unit 63 recognized by the host system 30 (that is, each logical unit provided by the storage system 1 to the host system 30), and the "LBA" column 64A2 stores the scope of LBA given to each block in the logical unit 63 recognized by the host system 30.

Further, the "FM adapter" column 64B is configured from an "LDEV number" column 64B1, an "internal LBA" column 64B2, an "FM module number" column 64B3, and an "FM module internal address" column 64B4.

The "LDEV number" column 64B1 stores the identification number of the LDEV 62 associated with the corresponding logical unit 63, and the "internal LBA" column 64B2 stores the scope of LBA of blocks existing in the LDEV 62 corresponding to the scope of LBA stored in the "LBA" column 64A2 of the same column. Moreover, the "FM module number" column 64B3 stores the identification number of the FM module 11 configuring the RAID group 61 (FIG. 8) providing the LDEV 62, and the "FM module internal LBA" column 64B4 stores the scope of LBA of blocks existing in the storage extent associated with the LDEV 62 in the FM module 11.

Accordingly, for instance, in the example of FIG. 9, it is evident that the scope of LBA of the logical unit 63 recognized by the host system 30 and having "1" as the LUN is "0 to 11999", the logical unit 63 is associated with the LDEV 62 having "1" as the identification number in the storage system 1, and the LBA of the LDEV 62 is "0 to 11999". Further, it is also evident that the LDEV 62 is associated with a storage extent in which the LBA in the FM modules 11 configuring one RAID group 61 and having "1" to "4" as the identification number is "0" to "3999".

When the FM adapter 38 of the storage controllers 31A, 31B (FIG. 6) is given a data I/O request (data write request or data read request) designating an address in the logical unit 63 from the host system 30 via the host system adapter 33, it refers to the first address conversion table 64, converts this address into an address in the LDEV 62 managed by the storage controllers 31A, 31B, further converts the address in the LDEV 62 into an address in the FM module 11, and sends a data I/O request designating this address as the data I/O destination to the corresponding FM module 11.

Figure 10:
FIG. 10 is a conceptual diagram showing a second address conversion table.

Further, the FM controller 42 (FIG. 7) of each FM module 11 retains a second address conversion table 65 shown in FIG. 10 in an internal memory not shown.

The second address conversion table 65 is a table for managing the relationship of the LBA of each block in the FM module 11 recognized by the storage controllers 31A, 31B, the identification number of the FM chip 20 in the FM module 11, and the block address in the storage extent in the FM chip 20, and is configured from an "FM module internal LBA" column 65A, an "FM chip number" column 65B, and an "FM chip internal address" column 65C.

The "FM chip number" column 65B stores the identification number of the corresponding FM chip 20, and the "FM chip internal address" column 65C stores the scope of physical address (block address of each block) in the FM chip 20. Further, the "FM module internal LBA" column 65A stores the scope of LBA in the FM module 11 corresponding to the physical address in the FM chip 20.

Thus, for instance, in the example of FIG. 10, it is evident that the storage extent in which the LBA provided by the FM module 11 is "0 to 399" is associated with the storage extent in which the address provided by the FM chip 20 having "1" as the identification number is in the scope of "0 to 399", and the storage extent in which the LBA provided by the FM module 11 is "400 to 799" is associated with the storage extent in which the address provided by the FM chip 20 having "2" as the identification number is in the scope of "0 to 399".

When the FM controller 42 of the FM module 11 is given a data I/O request designating the LBA in a self-system FM module 11 from the FM adapter 38 of the storage controllers 31A, 31B, it refers to the second address conversion table 65, converts this address into the identification number of the corresponding FM chip 20 and the address in such FM chip 20, and executes the data I/O processing to this address position.

(1-2) Correction Copy Function and Dynamic Sparing Function (1-2-1) Configuration of Chip Management Table and Block Management Table The correction copy function and the dynamic sparing function loaded in the storage system 1 are now explained.

The storage system 1 according to the present embodiment has a correction copy function of restoring, when a failure occurs in any one of the FM chips 20 in the FM module 11, data stored in such FM chip 20 subject to a failure (this is hereinafter referred to as a "failed FM chip"), and a dynamic sparing function of reading this data from the failed FM chip 20 and copying it to another FM chip 20.

Here, as the foregoing correction copy processing based on the correction copy function, there are two types; namely, first correction copy processing for copying the restored data in another FM chip 20 of the same FM module 11, and second correction copy processing for copying the restored data to the FM chip 20 in another FM module 11.

Similarly, as the foregoing dynamic sparing processing based on the dynamic sparing function, there are two types; namely, first dynamic sparing processing for copying data read from the failed FM chip 20 to another FM chip 20 in the same FM module 11, and second dynamic sparing processing for copying data read from the failed FM chip 20 in the FM chip 20 of another FM module 11.

In the storage system 1, as means for realizing the correction copy function and the dynamic sparing function, the FM controller 42 (FIG. 7) of each FM module 11 respectively retains a chip management table 70 as shown in FIG. 11, and a block management table 71 as shown in FIG. 12.

Among the above, the chip management table 70 is a table to be used by the FM controller 42 of the FM module 11 for managing the failure status of each FM chip 20 in the self-system FM module, and, as shown in FIG. 11, is configured from a "spare FM chip status" column 70A, an "FM chip number" column 70B, a "failed block quantity threshold value" column 70C, a "failed block quantity" column 70D, an "error flag" column 70E, a "RAID configuration status" column 70F, and a "status" column 70G.

Among the above, the "spare FM chip status" column 70A stores information (yes/no) regarding whether a spare (backup) FM chip (this is hereinafter referred to as a "spare FM chip") 20 exists in the FM module 11, and its identification number (FM chip number) when such spare FM chip 20 exists.

Further, the "FM chip number" column 70B stores the identification number of each FM chip 20 existing in the FM module 11, and the "failed block quantity" column 70D stores the number of blocks (this is hereinafter referred to as a "failed block quantity") to which a failure occurred in the FM chip 20.

Moreover, the "failed block quantity threshold value" column 70C stores a threshold value of the failed block quantity (this is hereinafter referred to as a "failed block quantity threshold value") set in advance regarding the FM chip 20, and the "error flag" column 70E stores an error flag ("1") when the failed block quantity exceeds the failed block quantity threshold value.

Further, the "RAID configuration status" column 70F stores information (yes/no) regarding whether this FM chip 20 is configuring any one of the RAID groups 61 (FIG. 8), and the identification number (RAID group number) of the RAID group 61 when the FM chip 20 is configuring any one of the RAID groups 61.

Moreover, the "status" column 70G stores information (allocated/unallocated) regarding whether the FM chip 20 is being allocated as a data storage extent. In the present embodiment, when a failure occurs in a certain FM chip 20, the spare FM chip 20 managed by the "spare FM chip status column" 70A is used as the chip for storing the data of this FM chip 20. Nevertheless, when there is no available spare FM chip, the FM controller 42 may refer to the "status" column 70G of the chip management table 70, and designate the FM chip 20 to which data is not allocated and store data.

Accordingly, for instance, in the example of FIG. 11, it is evident that the FM module 11 has FM chips 20 having an identification number of "n−2" to "n" as the spare FM chip 20. Further, for instance, it is evident that the FM chip 20 having an identification number of "2" has a failed block quantity threshold value of "100", the current failed block quantity is "1", and configures the RAID group 61 having an identification number of "1".

Moreover, the block management table 71 is a table for the FM controller 42 of the FM module 11 to manage the status of each block of the FM chip 20 existing in the self-system FM module 11, and is created for each FM chip 20. The block management table 71, as shown in FIG. 12, is configured from a "spare block status" column 71A, a "block address" column 71B, a "write count threshold value" column 71C, a "write count" column 71D, an "error count threshold value" column 71E, an "error count" column 71F, and an "error flag" column 71G.

Among the above, the "spare block status" column 71A stores information (yes/no) regarding whether a spare block (this is hereinafter referred to as a "spare block") exists in the FM chip 20, and its block address when a spare block exists. Further, the "block address" column 71B stores the block address of each block existing in the FM chip 20.

The "write count" column 71D stores the number of times data was written in the block, and the "write count threshold value" column 71C stores a threshold value of the write count (this is hereinafter referred to as a "write count threshold value") set in advance regarding the block.

Further, the "error count" column 71F stores the number of times a read error or a write error occurred in the block, and the "error count threshold value" column 71E stores a threshold value of the error count (this is hereinafter referred to as an "error count threshold value") set in advance regarding the block for determining that such block cannot be used.

Moreover, the "error flag" column 71G stores an error flag when the write count of data in the block exceeds the write count threshold value, or the number of times a read error or a write error occurred in the block exceeds the error count threshold value.

Accordingly, for instance, in the example of FIG. 12, it is evident that the corresponding FM chip 20 has blocks having an address of "m−3" to "m" as the spare blocks. Further, for instance, it is evident that the block having an address of "2" has a write count threshold value of "100000" times, an error count threshold value of "30" times, the current write count is "1122" times, the error count is "1" time, and that no failure has occurred (no error flag is raised).

Figure 13:
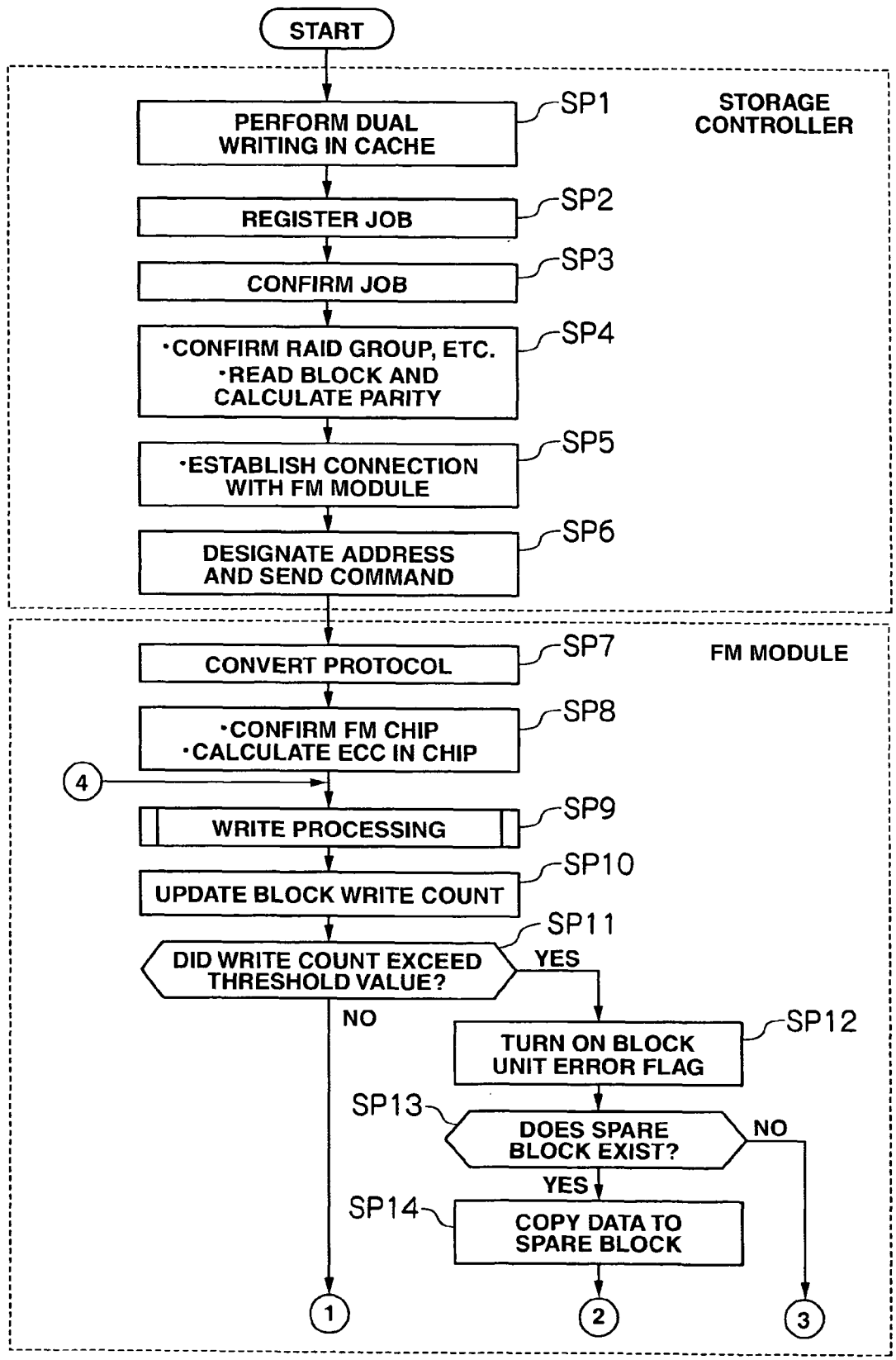
FIG. 13 is a flowchart showing the processing routine of data write/table update processing.
Figure 14:
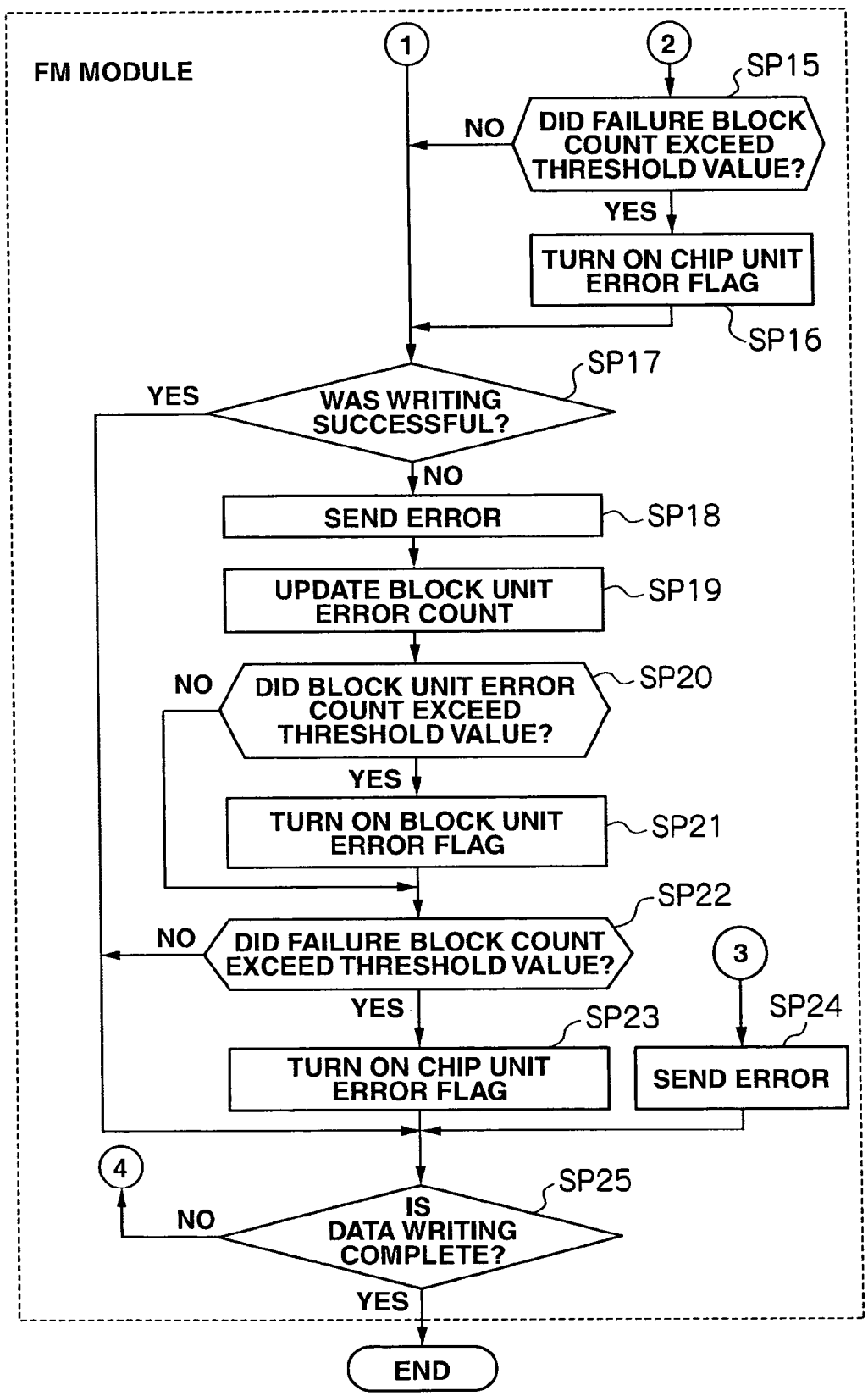
FIG. 14 is a flowchart showing the processing routine of data write/table update processing.
Figure 15:
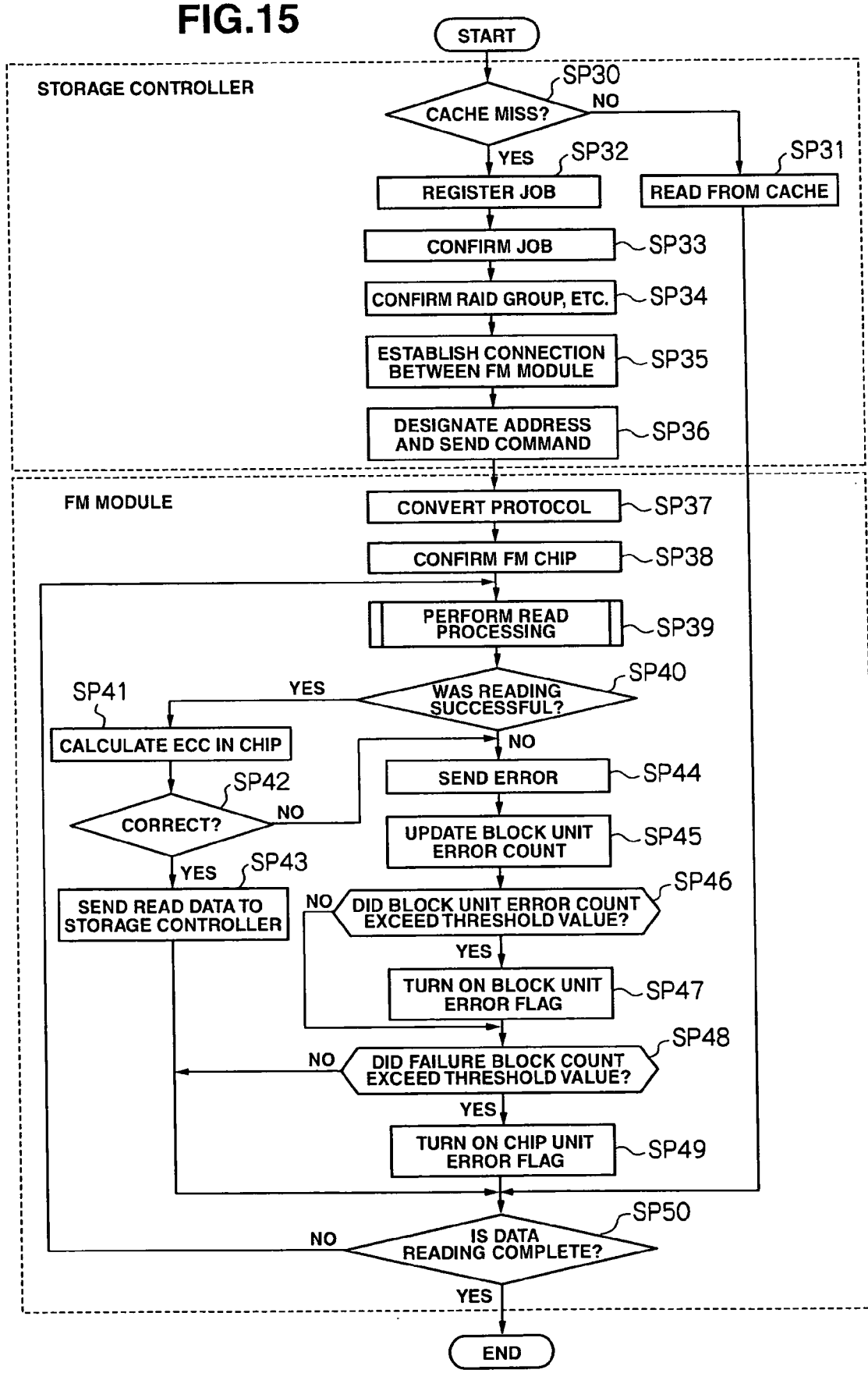
FIG. 15 is a flowchart showing the processing routine of data read/table update processing.

(1-2-2) Data Write/Table Update Processing and Data Read/Table Update Processing Here, the FM controller 42 of each FM module 11 updates the chip management table 70 and the block management table 71 as needed during the data write processing or the data read processing according to the data write/table update processing routine shown in FIG. 13 and FIG. 14, or the data read/table update processing routine shown in FIG. 15.

In other words, in the case of this storage system 1, when the channel adapter 33 of the storage controllers 31A, 31B (FIG. 6) receives a data write request from the host system 30 designating the write-target data and the address of its storage destination, it foremost dual writes this data in the cache memory 35 (SP1), and thereafter registers the job of the data write processing based on the data write request in the local memory 36 via the data transfer controller 34 (SP2).

Here, the microprocessor 37 is periodically monitoring the local memory 36, and, when the microprocessor 37 detects this job and confirms its contents (SP3), it refers to the first address conversion table 64 explained with reference to FIG. 9, confirms the RAID group 61 (FIG. 8) configured from the FM module 11, the FM chip 20 and the FM chip 20 in which the write-target data is to be written, and reads the necessary data from the corresponding FM chip 20 in the corresponding FM module 11 in order to calculate the parity (SP4).

Subsequently, the microprocessor 37 establishes the connection with the FM module 11 by controlling the FM adapter 38 (SP5), and thereafter sends the write-target data to the FM module 11 together with the identification number of the write destination FM chip 20 and the data write command designating the LBA in the FM chip 20 (SP6). Incidentally, the microprocessor 37 thereupon sequentially splits the write-target data in prescribed units, and designates the write destination of each split data and redundant data for writing the obtained split data in a plurality of FM chips 20 configuring the corresponding RAID group 61 with redundancy.

On the side of the FM module 11 that received the data write command and the write-target data, the data write command is protocol converted to a flash memory command in the FC-FM converter 43 of the data I/O processing unit 40 (FIG. 7) (SP7).

Further, the FM controller 42 of the data I/O processing unit 40 confirms the FM chip 20 in which the write-target data is to be written based on the protocol-converted data write command and the second address conversion table 65 (FIG. 10), and calculates the ECC (ECC in the chip) to be added to the data upon writing such data in the FM chip 20 (SP8).

Subsequently, the FM controller 42 writes the write data or one block worth of ECC in the designated address position in the designated FM chip 20 (SP9). The specific processing contents of the FM controller 42 in this case will be described later. Thereafter, the FM controller 42 increments by one the write count stored in the "write count" column 71D in the block management table 71 (FIG. 12) corresponding to the block in which the data was written (SP10).

Subsequently, the FM controller 42 refers to the corresponding "write count" column 71D of the block management table 71 (FIG. 12) and the "write count threshold value" column 71C corresponding thereto regarding the block in the FM chip 20 in which the data was written, and determines whether the data write count in such block exceeds the write count threshold value set to this block (SP11). The FM controller 42 proceeds to step SP17 upon obtaining a negative result in this determination.

Contrarily, when the FM controller 42 obtains a positive result in this determination, it stores an error flag in the "error flag" column 71G corresponding to the block in the block management table 71 (SP12). Thereby, this block will be registered as a block subject to a failure (error). Further, at this time, the FM controller 42 additionally increments by one the failed block quantity stored in the "failed block quantity" column 70C corresponding to the FM chip 20 in the chip management table 70 (FIG. 11).

Subsequently, the FM controller 42 refers to the "spare block status" column 71A of the block management table 71 and determines whether an unused spare block exists in the FM chip 20 (SP13).

When the FM controller 42 obtains a negative result in this determination, it controls the FC-FM converter 43 (FIG. 7) and sends an error notice to the FM adapter 38 of the storage controller 31A, 31B (SP24). Thereby, an error report based on this error notice is sent from the storage controllers 31A, 31B to the corresponding host system 30. The FM controller 42 thereafter determines whether the writing of all data is complete (SP25), returns to step SP9 upon obtaining a negative result in this determination, and contrarily ends the data write/table update processing upon obtaining a positive result.

Meanwhile, when the FM controller 42 obtains a positive result in the determination at step SP13, it controls the FC-FM converter 43 and copies the data written in the block at step SP9 to a spare block in which its existence was confirmed at step SP13 (SP14).

Subsequently, the FM controller 42 refers to the "failed block quantity threshold value" column 70C and the "failed block quantity" column 70D corresponding to the FM chip 20 in the chip management table 70 in which data was written, and determines whether the failed block quantity in the FM chip 20 exceeded the predetermined failed block quantity threshold value regarding such FM chip 20 (SP15).

The FM controller 42 proceeds to step SP17 upon obtaining a negative result in this determination, and contrarily stores an error flag in the "error flag" column 70E corresponding to the FM chip 20 in the chip management table 70 upon obtaining a positive result (SP16), and thereafter proceeds to step SP17.

Meanwhile, when the FM controller 42 proceeds to step SP17, it determines whether the writing of write-target data succeeded (that is, whether it was possible to write data) (SP17). When the FM controller 42 obtains a positive result in this determination, it determines whether the writing of all data is complete (SP25).

The FM controller 42 returns to step SP9 upon obtaining a positive result in this determination, and thereafter repeats the same processing until the writing of all data is complete (SP9 to SP25-SP9). Further, when the FM controller 42 obtains a positive result in the determination at step SP25 as a result of all data being written, it ends this data write/table update processing.

Contrarily, when the FM controller 42 obtains a negative result in the determination at step SP17, it controls the FC-FM converter 43 (FIG. 7) and sends a write error notice to the FM adapter 38 of the storage controllers 31A, 31B (SP18). Thereby, an error report based on this write error notice is sent from the storage controllers 31A, 31B to the corresponding host system 30.

Subsequently, the FM controller 42 increments by one the error count stored in the corresponding "error count" column 71F in the block management table 71 regarding the blocks in which the writing of data ended in a failure in the data write processing at step SP9 (SP19).

Further, the FM controller 42 refers to the "error count" column 71F and the "error count threshold value" column 71E corresponding to the block management table 71 regarding that block, and determines whether the error count of this block exceeds the error count threshold value set to the block (SP20).

The FM controller 42 proceeds to step SP22 upon obtaining a negative result in this determination, and stores an error flag in the "error flag" column 71G corresponding to that block in the block management table 71 (SP21). Thereby, this block will be registered as a failed block. Further, at this time, the FM controller 42 also increments by one the failed block quantity stored in the "failed block quantity" column 70D corresponding to the FM chip 20 in the chip management table 70.

Thereafter, the FM controller 42 refers to the "failed block quantity" column 70D and the "failed block quantity threshold value" column 70C corresponding to that FM chip 20 of the chip management table 70, and determines whether the failed block quantity in the FM chip 20 has exceeded the failed block quantity threshold value set to the FM chip 20 (SP22).

The FM controller 42 ends this data write/table update processing upon obtaining a negative result in this determination, and contrarily stores an error flag in the "error flag" column 70E corresponding to the FM chip 20 in the chip management table 70 upon obtaining a positive result (SP23). Thereby, this FM chip 20 will be registered as a failed FM chip.

The FM controller 42 thereafter determines whether the writing of all data is complete (SP25), and returns to step SP9 upon obtaining a negative result in this determination, and ends this data write/table update processing upon obtaining a positive result.

Meanwhile, when the channel adapter 33 of the storage controllers 31A, 31B (FIG. 6) receives a data read request from the host system 30 designating an address, it foremost determines whether read-target data is stored in the cache memory 37 according to the data read/table update processing routine shown in FIG. 15 (SP30).

When the channel adapter 33 obtains a negative result in this determination, it reads the read-target data from the cache memory 37 (SP31), sends the data to the host system 30, and thereafter ends this data read/table update processing.

Contrarily, when the channel adapter 33 obtains a positive result in this determination, it registers the job of data read processing based on the data read request in the local memory 36 via the data transfer controller 34 (SP32).

Here, the microprocessor 37 is periodically monitoring the local memory 36 as described above, and when the microprocessor 37 detects this job and confirms its contents (SP33), it refers to the first address conversion table 64 explained with reference to FIG. 9, and confirms the RAID group 61 (FIG. 8) or the like configured from the FM module 11, the FM chip 20 and the FM chip 20 to read the data (SP34).

Subsequently, the microprocessor 37 controls the FM adapter 38 to establish the connection with the FM module 11 (SP35), and thereafter sends to the FM module 11 the data read command designating the identification number of the FM chip 20 storing the read-target data and address in the FM chip 20 (SP36).

On the side of the FM module 11 that received the data read command, this data read command is protocol converted into an FM protocol in the FC-FM converter 43 of the data I/O processing unit 40 (FIG. 7) (SP37).

Further, the FM controller 42 of the data I/O processing unit 40 confirms the FM chip 20 storing the read-target data based on the protocol-converted data read command and the second address conversion table 65 (FIG. 10) (SP38).

Subsequently, the FM controller 43 reads the read-target data one block worth at a time from the corresponding address position in a plurality of FM chips 20 configuring the corresponding RAID group 61 (SP39). The specific processing contents of the FM controller 42 in the foregoing case will be described later. Thereafter, the FM controller 42 determines whether the reading of data succeeded (that is, whether it was possible to read data) (SP40).

When the FM controller 42 obtains a positive result in this determination, it calculates the ECC of the read data (SP41), and verifies whether this data is correct based on the calculated ECC (SP42).

When the FM controller 42 obtains a positive result in this verification, it sends one block worth of the read data to the storage controllers 31A, 31B (SP43). Thereby, data read from a plurality of FM chips 20 is thereafter combined in the storage controllers 31A, 31B and recovered as data in the original data format. The recovered data is then sent to the corresponding host system 30.

The FM controller thereafter determines whether the reading of all data is complete (SP50). The FM controller 42 returns to step SP39 upon obtaining a positive result in this determination, and thereafter repeats the same processing until the reading of all data is complete (SP39 to SP50-SP39). Further, when the FM controller 42 obtains a positive result in the determination at step SP50 as a result of all data being read, it ends this data read/table update processing.

Contrarily, when the FM controller 42 obtains a negative result in the determination at step SP40 or step SP42, it controls the FC-FM converter 43 (FIG. 7) and sends a read error notice to the FM adapter 38 of the storage controllers 31A, 31B (SP44). Thereby, an error report based on this read error notice is sent from the storage controllers 31A, 31B to the corresponding host system 30.

Subsequently, the FM controller 42 increments by one the error count stored in the corresponding "error count" column 71F of the block management table 71 regarding the blocks in which the reading of data ended in a failure (SP45). Further, the FM controller 42 refers to the "error count" column 71F and the "error count threshold value" column 71E corresponding to the block management table 71 regarding the relevant block, and determines whether the error count in that block has exceeded the error count threshold value set to the block (SP46).

The FM controller 42 proceeds to step SP48 upon obtaining a negative result in this determination, and contrarily stores an error flag in the "error flag" column 71G corresponding to the block in the block management table 71 upon obtaining a positive result (SP47). Thereby, this block will be registered as a failed block. Further, at this time, the FM controller 42 also increments by one the failed block quantity stored in the "failed block quantity" column 70D corresponding to the FM chip 20 in the chip management table 70.

Thereafter, the FM controller 42 refers to the "failed block quantity" column 70D and the "failed block quantity threshold value" column 70C corresponding to the FM chip 20 in the chip management table 70, and determines whether the failed block quantity in the FM chip 20 has exceeded the failed block quantity threshold value set to the FM chip 20 (SP48).

When the FM controller 42 obtains a negative result in this determination, it determines whether the reading of all data is complete (SP50). The FM controller 42 returns to step SP39 upon obtaining a negative result in this determination, and contrarily ends this data read/table update processing upon obtaining a positive result.

Meanwhile, when the FM controller 42 obtains a positive result in the determination at step SP48, it stores an error flag in the "error flag" column 70E corresponding to the FM chip 20 in the chip management table 70 (SP49). Thereby, the FM chip 20 will be registered as a failed FM chip.

The FM controller 42 thereafter proceeds to step SP50 and determines whether the reading of all data is complete (SP50). The FM controller 42 returns to step SP39 upon obtaining a negative result in this determination, and contrarily ends this data read/table update processing upon obtaining a positive result.

(1-2-3) Correction Copy Processing and Dynamic Sparing Processing (1-2-3-1) Failed FM Chip Data Copy Processing The specific processing contents of the foregoing first and second correction copy processing and the first and second dynamic sparing processing to be performed using the chip management table 70 (FIG. 11) and the block management table 71 (FIG. 12) are now explained.

Figure 16:
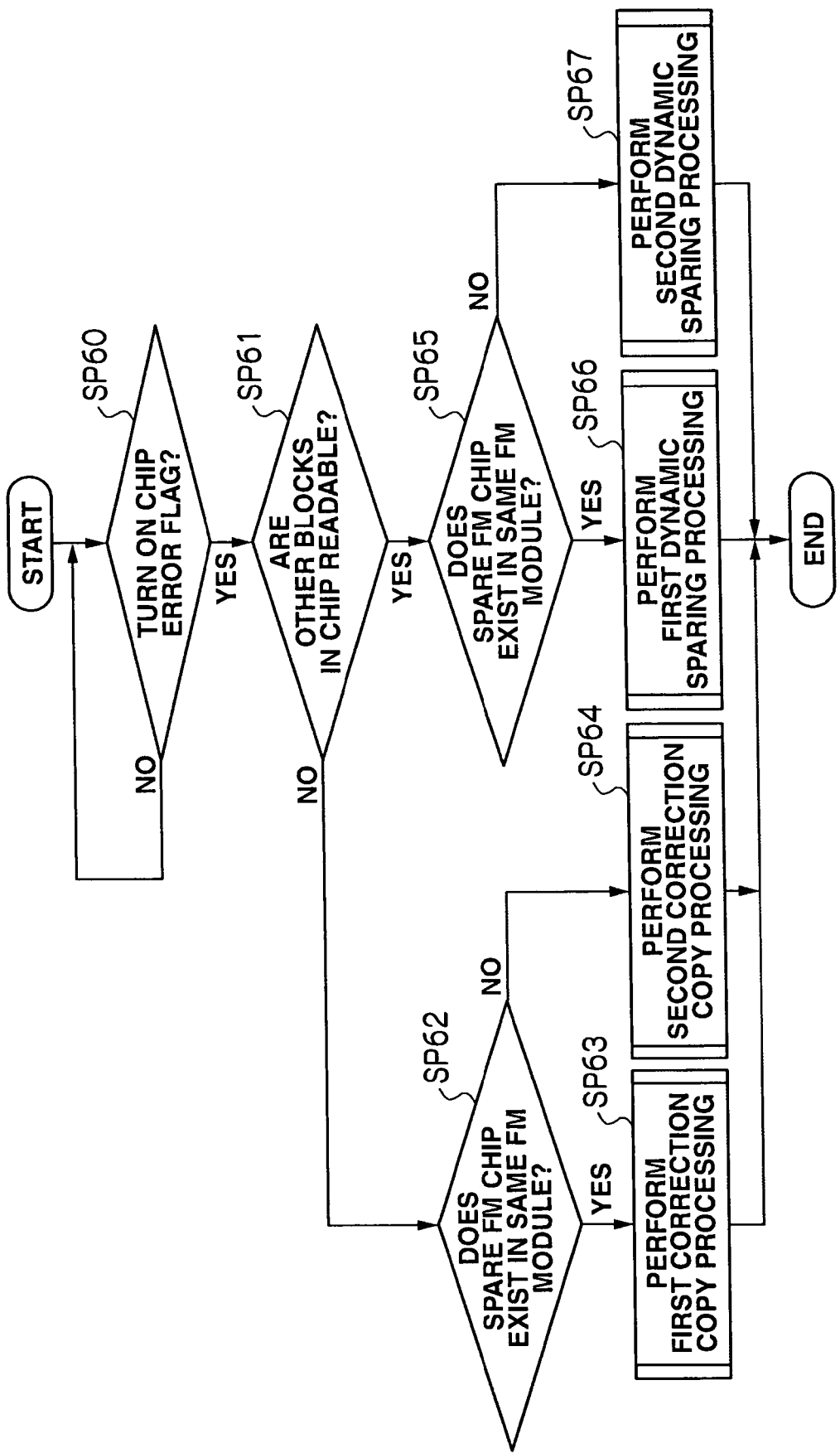
FIG. 16 is a flowchart showing the processing routine of failed FM chip data copy processing.

FIG. 16 is a flowchart showing the processing contents of the FM controller 42 of the FM module 11 when a failure occurs in any one of the FM chips 20 in the FM module 11. When a failure occurs in the FM chip 20 of the self-system FM module 11, the FM controller 42 selects and executes one processing routine that is optimal among the first and second correction copy processing and the first and second dynamic sparing processing based on whether data stored in the failed FM chip 20 can be restored, and whether a spare FM chip 20 exists in the self-system FM module 11.

In other words, the FM controller 42 is constantly monitoring the "error flag" column 70E of the chip management table 70 explained above with reference to FIG. 11 that it personally retains (SP60).

When an error flag is stored in any one of the "error flag" columns 70E, the FM controller 42 verifies whether it is possible to read data from blocks other than the block from which data was attempted to be read or written in the FM chip 20 (SP61).

When the FM controller 42 obtains a negative result in this determination, it refers to the "spare chip status" column 70A in the chip management table 70, and determines whether a spare FM chip 20 exists in the self-system FM module 11 (SP62). The FM controller 42 executes first correction copy processing upon obtaining a positive result in this determination (SP63), and executes second correction copy processing upon obtaining a negative result (SP64).

Meanwhile, when the FM controller 42 obtains a positive result in the determination at step SP61, it refers to the "spare chip status" column 70A in the chip management table 70, and determines whether a spare FM chip 20 exists in the self-system FM module 11 (SP65). The FM controller 42 executes first dynamic sparing processing upon obtaining a positive result in this determination (SP66), and executes second dynamic sparing processing upon obtaining a negative result (SP67).

(1-2-3-2) First Correction Copy Processing

Figure 17:
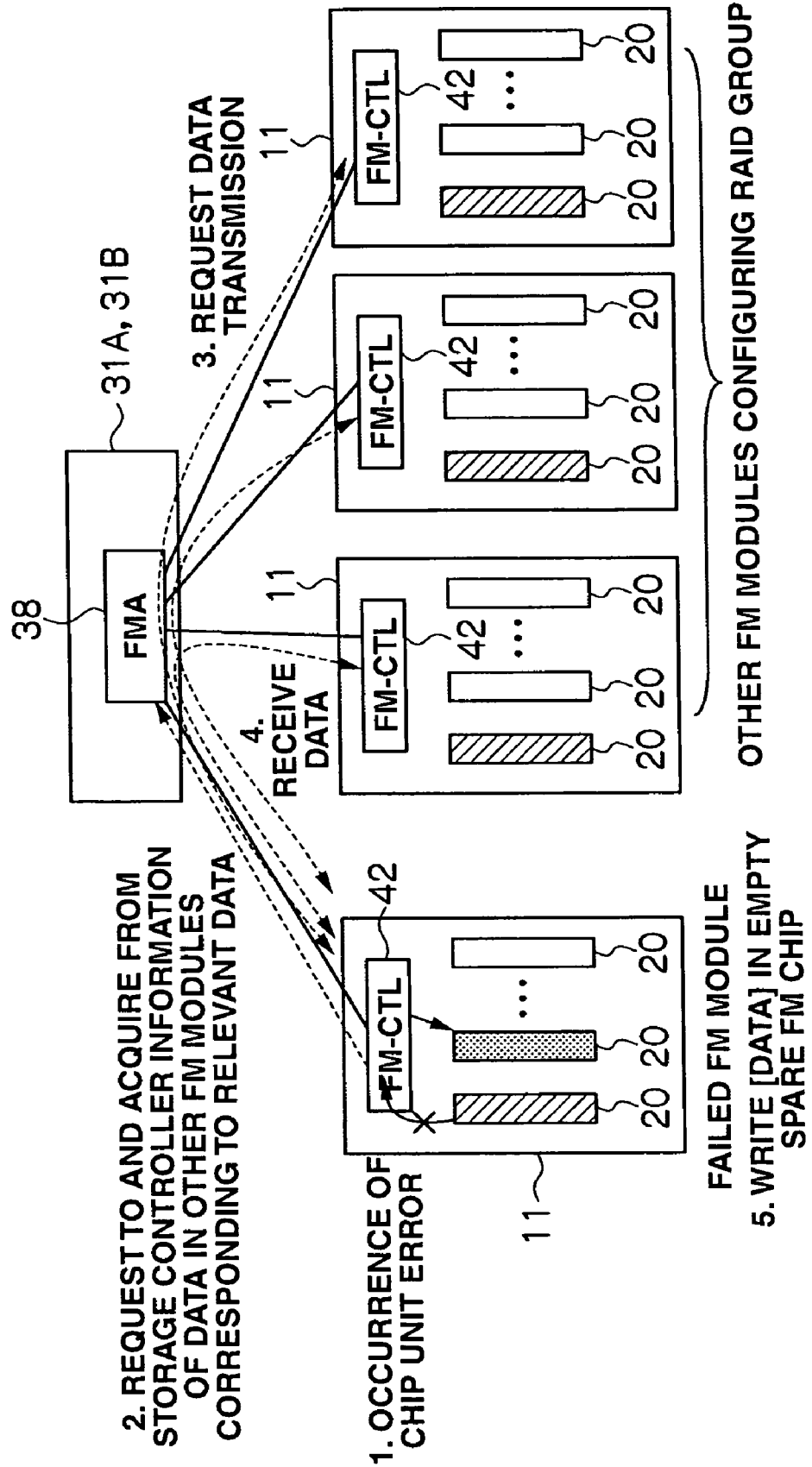
FIG. 17 is a conceptual diagram showing the outline of first correction copy processing.

FIG. 17 shows the outline of the foregoing first correction copy processing. In this first correction copy processing, the FM controller 42 of an FM module (this is hereinafter referred to as a "failed FM module") 11 in which a failure occurred in any one of the FM chips 20 requests the transfer of necessary data to another FM module 11 storing another FM chip 20 of the RAID group 61 to which the failed FM chip 20 belongs.

Then, the FM controller 42 of the failed FM module 11 restores the data stored in the failed FM chip 20 based on the data sent from the other FM module 11, and writes the restored data in the spare FM chip 20 of the failed FM module 11.

Figure 18:
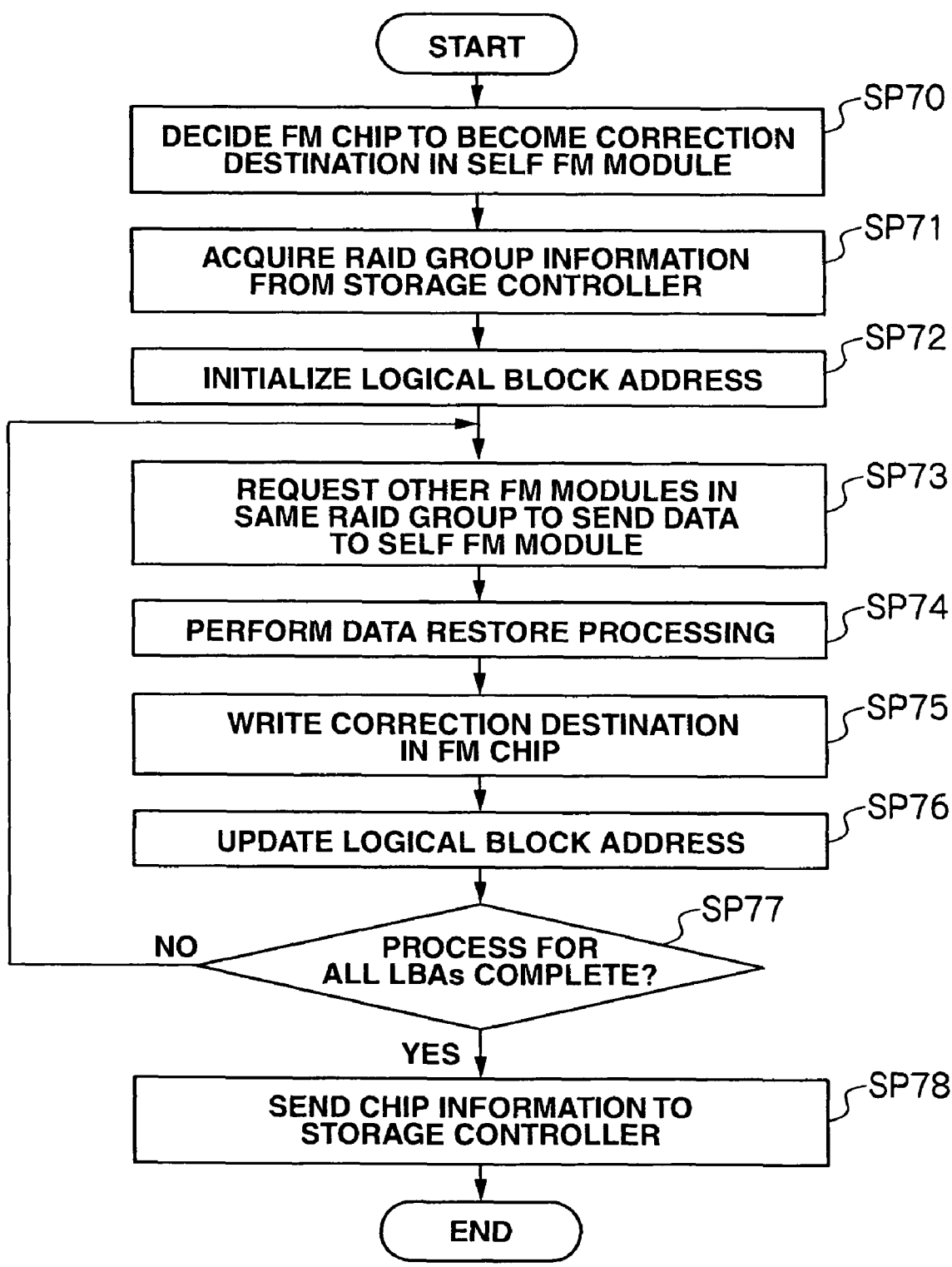
FIG. 18 is a flowchart showing the flow of first correction copy processing.

FIG. 18 is a flowchart showing the specific flow of the first correction copy processing. When the FM controller 42 of the failed FM module 11 proceeds to step SP63 of the failed FM chip data copy processing explained with reference to FIG. 16, it starts this first correction copy processing, and foremost refers to the chip management table 70 and decides the spare FM chip 20 in the self-system FM module 11 storing the restored data of the data stored in the failed FM chip 20 (SP70).

Subsequently, the FM controller 42 requests the storage controllers 31A, 31B to send various information (this is hereinafter referred to as "RAID group information") concerning the RAID group 61 to which the failed FM chip 20 belongs such as the identification number of the other FM chip 20 in the RAID group 61 to which the failed FM chip 20 belongs, and acquires such information (SP71).

Subsequently, the FM controller 42 sets the address of the block (initializes the block address) to start the copying of the restored data in the spare FM chip 20 decided as the storage destination of the restored data in the step SP70 (SP72).

Thereafter, the FM controller 42 requests data transmission to the FM controller 42 of the corresponding other FM module 11 to read data required to restore one block worth of target data at the time from another FM chip 20 configuring the same RAID group 61 as the failed FM chip 20 and send it to the self-system FM module 11 via the FM adapter 38 based on the RAID group information acquired at step SP71 (SP73).

When one block worth of necessary data is transferred from the other FM module 11 to the FM adapter 38, the FM controller 42 restores the data stored in the failed FM chip 20 based on such data (SP74), and writes the obtained one block worth of restored data in the block of the address (address set at step SP72 at the initial stage) set at that time as the data write destination in the spare FM chip 20 decided at step SP70 (SP75).

Subsequently, the FM controller 42 updates the value set as the address of the block of the write destination of the restored data in the spare FM chip 20 to the subsequent address of the block in which the restored data was written at step SP75 (that is, an address that is "1" greater than the address of the block in which the restored data was written at step SP75) (SP76).

Thereafter, the FM controller 42 determines whether the correction copy for all blocks in the failed FM chip 20 is complete (SP77). The FM controller 42 returns to step SP73 upon obtaining a negative result in this determination, and thereafter repeats the processing at step SP73 to step SP77 until the same processing to all blocks in the failed FM chip 20 is complete.

Further, when the FM controller 42 eventually completes the correction copy for all blocks in the failed FM chip 20, it sends chip information to the FM adapter 38 to the effect that the spare FM chip 20 storing the restored data will be used instead of the failed FM chip 20 (SP78). Incidentally, the FM adapter 38 that received this chip information updates the address of the block written with the original data in the spare FM chip 20 containing this chip information for the processing at step SP203 illustrated in FIG. 31 described later to the address of the block written with the restored data. The FM controller 42 thereafter ends this first correction copy processing.

(1-2-3-3) Second Correction Copy Processing

Figure 19:
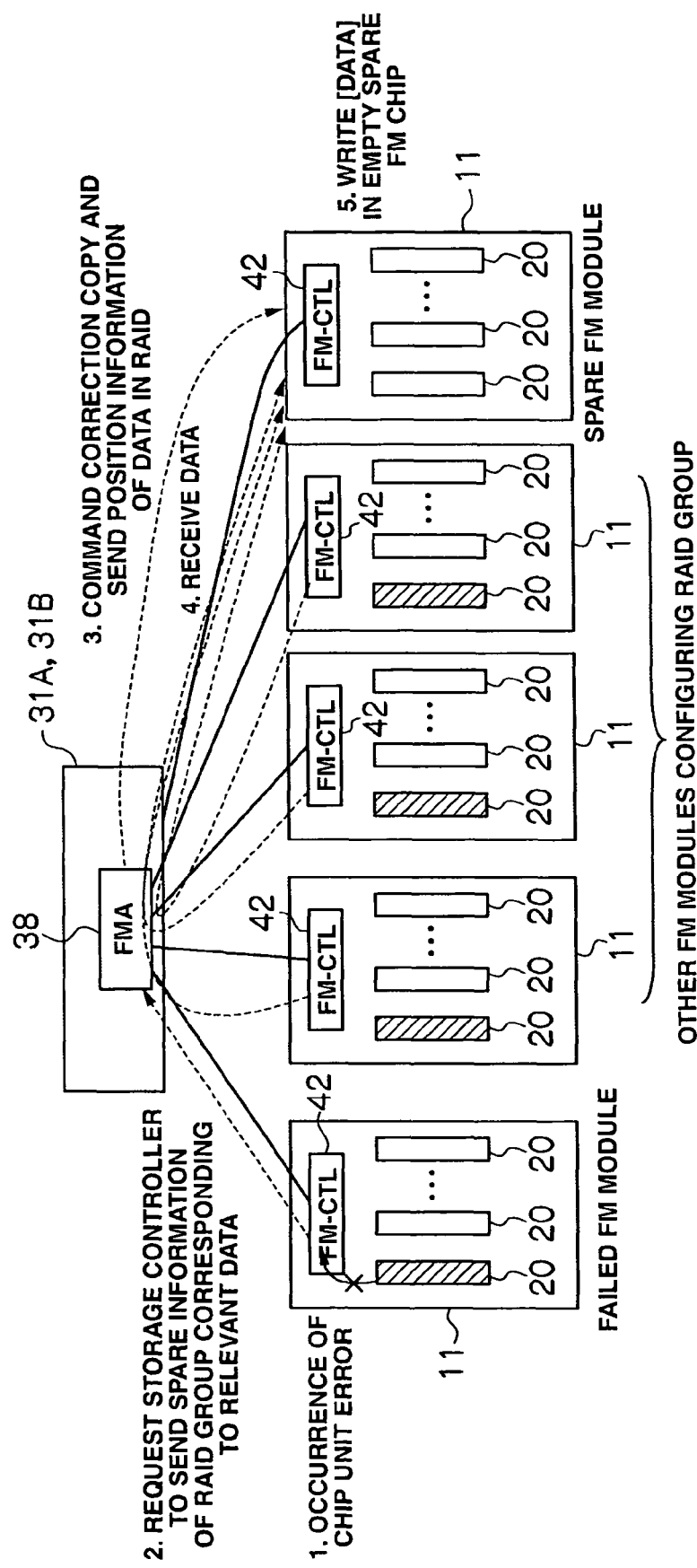
FIG. 19 is a conceptual diagram showing the outline of second correction copy processing.

FIG. 19 shows the outline of the foregoing second correction copy processing. In the second correction copy processing, the FM controller 42 in the failed FM module 11 requests the FM controller 42 of a spare FM module (this is hereinafter referred to as a "spare FM module") 11 to restore and copy the data stored in the failed FM chip 20.

The FM controller 42 of the spare FM module 11 requested to restore and copy the data requests the transfer of necessary data to the FM controller 42 of another FM module 11 configuring the same RAID group 61 as the failed FM chip 20.

Then, the FM controller 42 of the spare FM module 22 restores the data stored in the failed FM chip 20 based on the data sent from the other FM module 11, and writes the restored data in the FM chip 20 of the self-system FM module 11.

Figure 20:
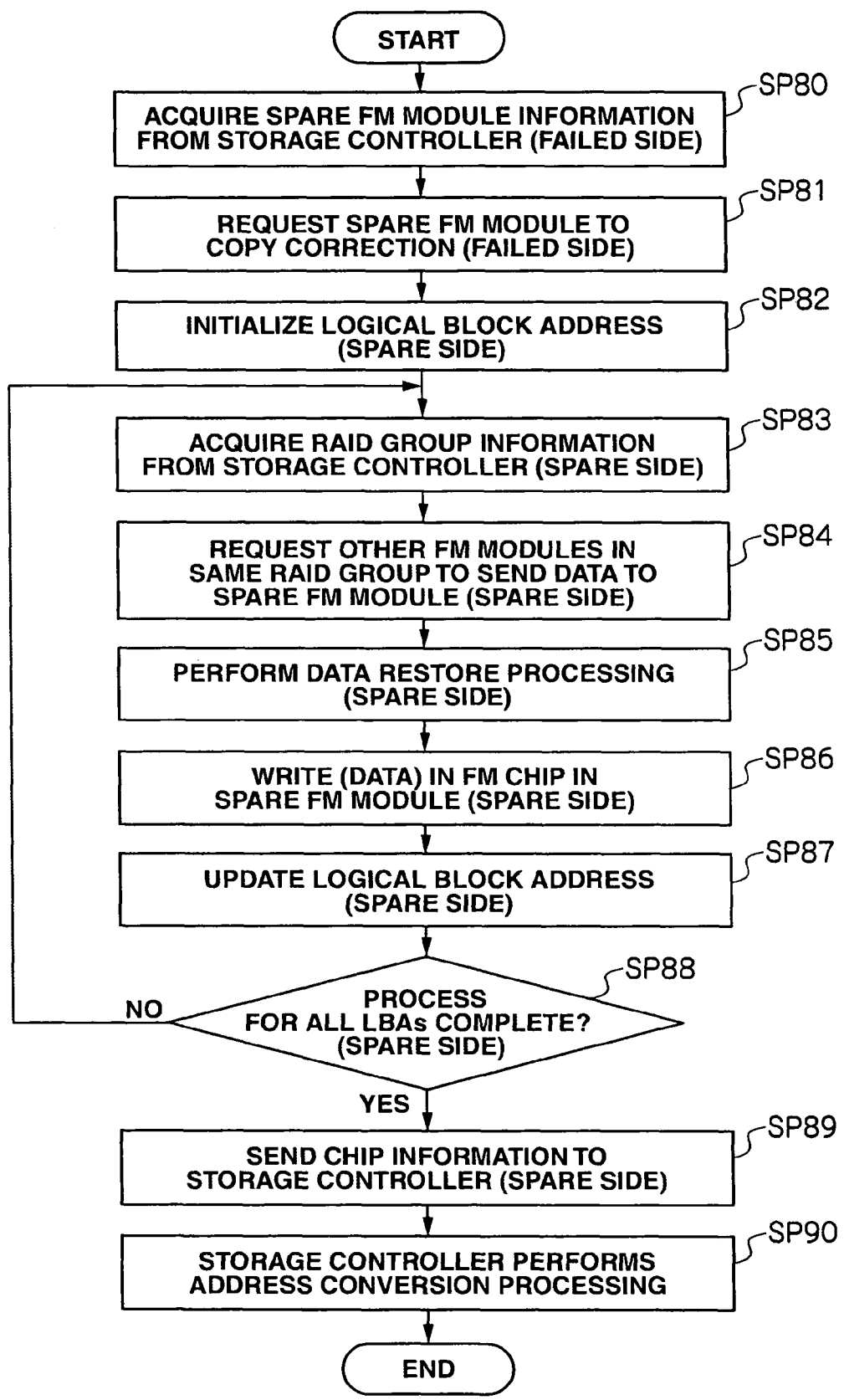
FIG. 20 is a flowchart showing the flow of second correction copy processing.

FIG. 20 is a flowchart showing the specific flow of the second correction copy processing. When the FM controller 42 of the failed FM module 11 proceeds to step SP64 of the failed FM chip data copy processing explained with reference to FIG. 16, it starts the second correction copy processing, and foremost acquires information concerning the spare FM module 11 (this is hereinafter referred to as "spare FM module information") from the FM adapter 38 of the storage controllers 31A, 31B, and selects and determines the spare FM module 11 to become the correction copy destination of the data stored in the failed FM chip 20 and the FM chip 20 in the spare FM module based on the acquired spare FM module information (SP80).

Then, the FM controller 42 of the failed FM module 11 requests the FM controller 42 of the spare FM module 11 to restore and copy the data stored in the failed FM chip 20 to the FM chip (SP81).

Meanwhile, the FM controller 42 of the spare FM module 11 that received this request sets an address of the block for starting the correction copy in the FM chip 20 decided at step SP80 (SP82). Further, the FM controller 42 requests the FM adapter 38 to send the RAID group information of the RAID group 61 to which the failed FM chip 20 belongs, and acquires such information (SP83).

Thereafter, the FM controller 42 of the spare FM module 11 requests data transmission to each corresponding FM module 11 to read data required to restore one block worth of data of the failed FM chip 20 from the FM chip 20 configuring the same RAID group 61 as the failed FM chip 20 and send it to the self-system FM module 11 via the FM adapter 38 based on the RAID group information (SP84).

When the necessary data is transferred from all other FM modules 11 via the FM adapter 38, the FM controller 42 of the spare FM module 11 restores one block worth of data stored in the failed FM chip 20 based on the transferred data (SP85), and writes the obtained restored data into the FM chip 20 designated at step SP84 in the self-system FM module 11 (SP86).

Subsequently, the FM controller 42 of the spare FM module 11 updates the value set as the address of the block of the write destination of the restored data in the FM chip 20 to the subsequent address of the block in which the restored data was written at step SP86 (SP87).

Thereafter, the FM controller 42 of the spare FM module 11 determines whether the foregoing correction copy of all blocks in the failed FM chip 20 is complete (SP88). The FM controller 42 returns to step SP83 upon obtaining a negative result in this determination, and thereafter repeats the processing at step SP83 to step SP88 until the same processing to all blocks in the failed FM chip 20 is complete.

When the FM controller 42 of the spare FM module 11 eventually completes the correction copy of all blocks in the failed FM chip 20, it sends chip information to the FM adapter 38 to the effect that the spare FM chip 20 storing the restored data will be used instead of the failed FM chip 20 (SP88).

When the FM adapter 38 receives this chip information, it executes address conversion processing for converting the storage destination of the corresponding data into the FM chip 20 in the spare FM module 11 according to such chip information (SP89). This second correction copy processing is thereby ended.

Incidentally, in addition to the method where the FM controller 42 of the spare FM module 11 takes initiative in the second correction copy processing, a method where the FM controller 42 of the failed FM module 11 takes initiative can also be applied.

Figure 21:
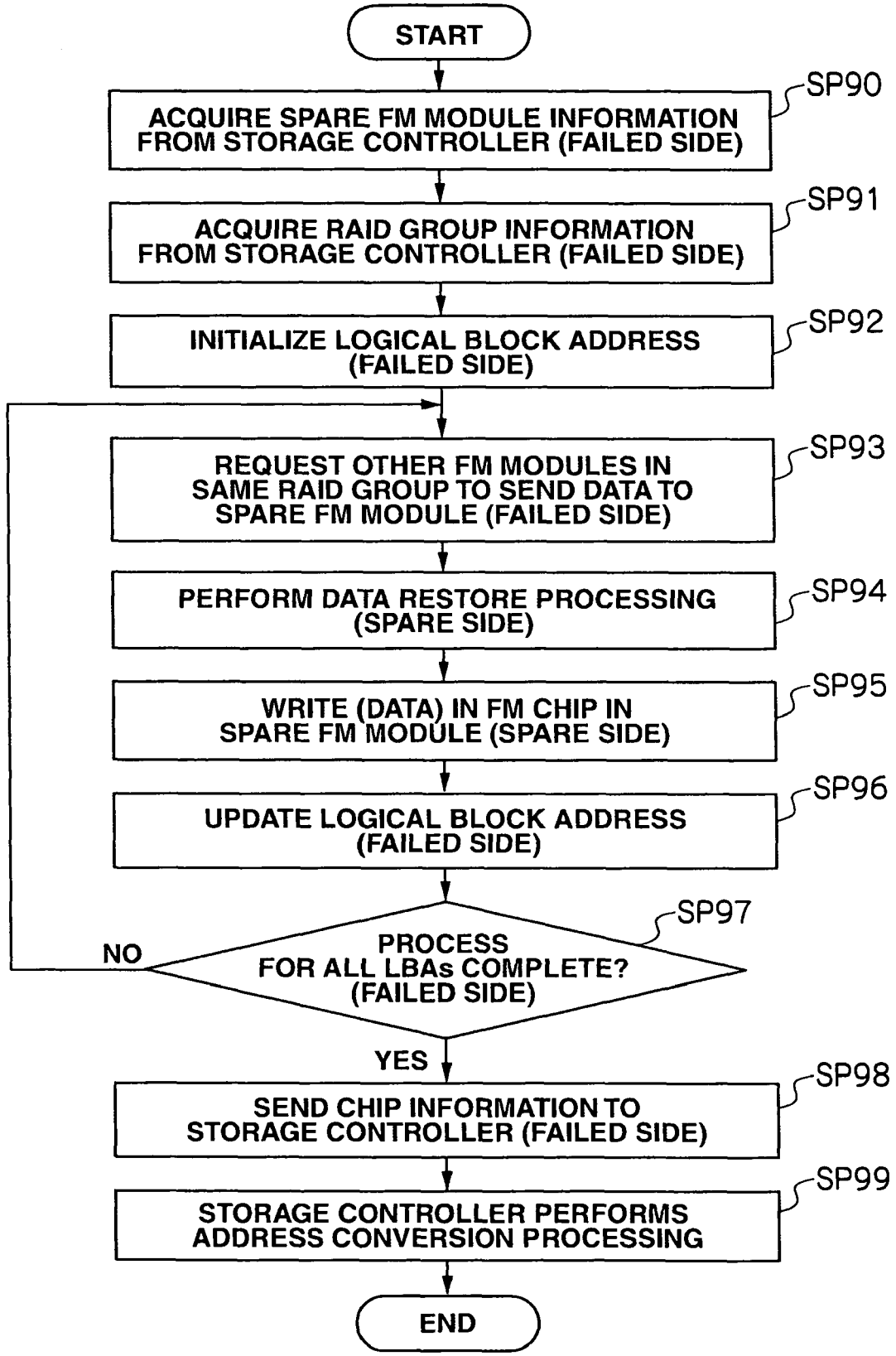
FIG. 21 is a flowchart showing a modified example of second correction copy processing.

FIG. 21 shows the processing routine in a case where the FM controller 42 of the failed FM module 11 takes initiative in performing the second correction copy processing.

In the foregoing case, the FM controller 42 of the failed FM module 11 foremost acquires the spare FM module information from the FM adapter 38 of the storage controllers 31A, 31B, and selects and decides the spare FM module 11 to become the correction copy destination of the data stored in the failed FM chip 20, and the FM chip 20 in the spare FM module based on the acquired spare FM module information (SP90).

Subsequently, the FM controller 42 of the failed FM module 11 acquires the RAID group information of the RAID group to which the failed FM chip 20 belongs from the FM adapter 38 (SP91), and thereafter sets the address of the block for starting the copy of the restored data in the spare FM chip 20 decided as the storage destination of the restored data at step SP90 (SP92).

Subsequently, the FM controller 42 of the failed FM module 11 requests the corresponding FM module 11 to read data necessary in restoring one block worth of data of the failed FM chip 20 from the FM chip 20 configuring the same RAID group 61 as the failed FM chip 20 via the FM adapter 38 based on the RAID group information acquired at step SP91, and send it together with the data write request for writing such data in the FM chip 20 decided as the copy destination at step SP90 to the spare FM module 11 decided at step SP90 (SP93).

Thereby, the FM controller 42 of each FM module 11 that received the request will read the necessary data from the corresponding FM chip 20, and send this together with the data write request to the designated spare FM module 11 via the FM adapter 38.

Then, the FM controller 42 of the spare FM module 11 that received such data and data write request from each of the corresponding FM modules 11 restores the one block worth of data stored in the failed FM chip 20 based on the foregoing data (SP94), and writes the obtained restored data in the block of the address set as the data write destination at such time in the designated FM chip 20 (SP95).

Thereafter, the FM controller 42 of the failed FM module 11 updates the value set as the address of the block of the write destination of the restored data in the FM chip 20 written with the restored data to the subsequent address of the block in which the restored data was written at step SP95 (SP96).

Subsequently, the FM controller 42 of the failed FM module 11 determines whether the foregoing correction copy of all blocks in the failed FM chip 20 is complete (SP97). The FM controller 42 returns to step SP93 upon obtaining a negative result in this determination, and thereafter repeats the processing at step SP93 to step SP97 until the same processing for all blocks in the failed FM chip 20 is complete.

Further, when the FM controller 42 of the failed FM module 11 eventually completes the correction copy of all blocks in the failed FM chip 20, it sends chip information to the FM adapter 38 to the effect that the spare FM chip 20 storing the restored data will be used instead of the failed FM chip 20 (SP98).

When the FM adapter 38 receives this chip information, it executes address conversion processing for converting the storage destination of the corresponding data into the FM chip 20 in the spare FM module 11 according to such chip information (SP99). This second correction copy processing is thereby ended.

(1-2-3-4) First Dynamic Sparing Processing

Figure 22:
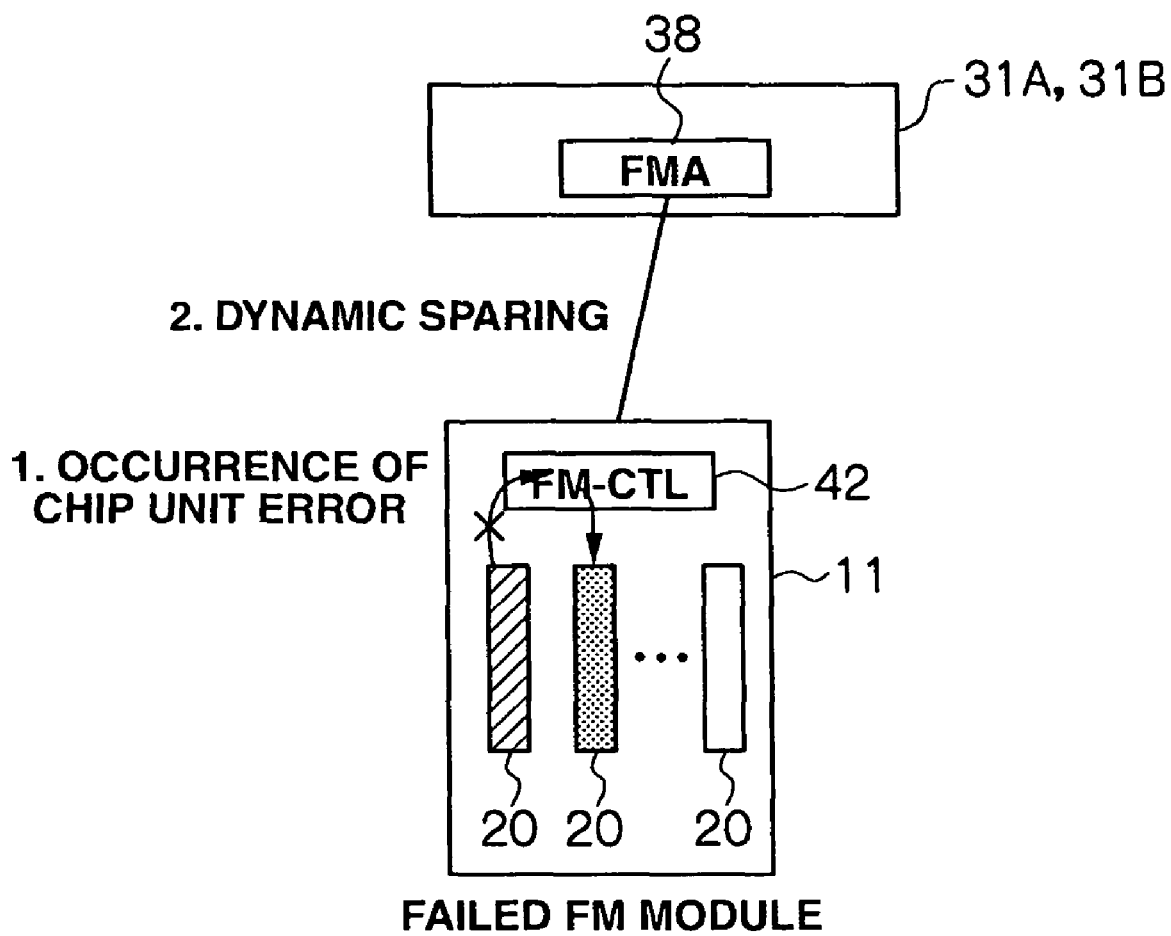
FIG. 22 is a conceptual diagram showing the outline of first dynamic sparing processing.

FIG. 22 shows the outline of the foregoing first dynamic sparing processing. In this first dynamic sparing processing, the FM controller 42 in the failed FM module 11 writes the data stored in the failed FM chip 20 in the FM chip 20 not subject to a failure in the self-system FM module 11 while restoring such data as needed.

Figure 23:
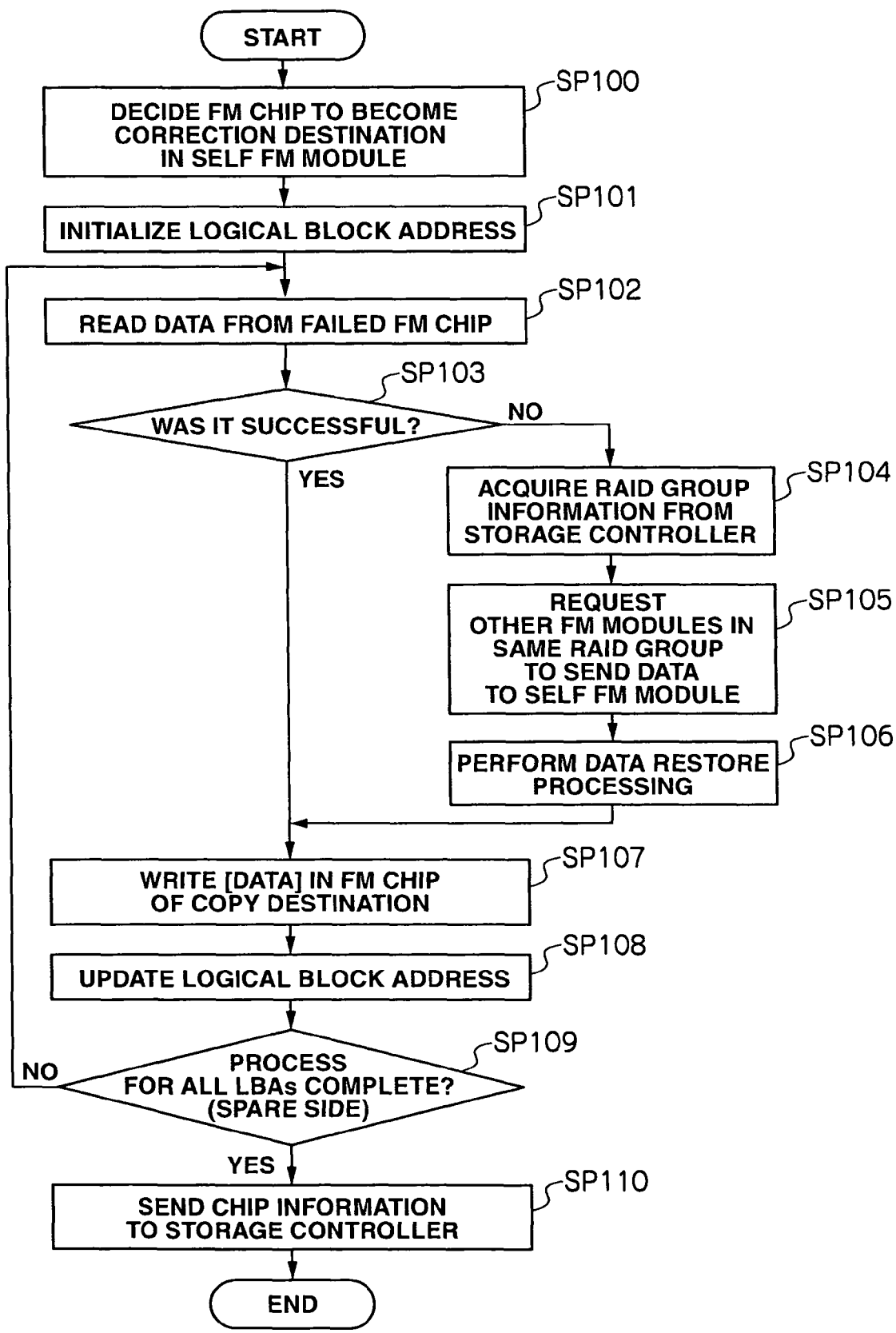
FIG. 23 is a flowchart showing the flow of first dynamic sparing processing.

FIG. 23 is a flowchart showing the specific flow of this first dynamic sparing processing. When the FM controller 42 of the failed FM module 11 proceeds to step SP66 of the failed FM chip data copy processing explained with reference to FIG. 16, it starts this first dynamic sparing processing, and foremost selects and decides the FM chip 20 to become the copy destination of the data stored in the failed FM chip 20 among the spare FM chips 20 in the self-system FM module 11 (SP100).

Subsequently, the FM controller 42 sets the address of the block to start the correction copy in the FM chip 20 decided at step SP100 (SP101). Further, the FM controller 42 executes data read processing for reading one block worth of data from the failed FM chip 20 (SP102), and thereafter determines whether the data read processing succeeded (that is, whether it was possible to read one block worth of data) (SP103).

When the FM controller 42 obtains a positive result in this determination, it writes the read one block worth of data into the spare FM chip 20 of the self-system FM module 11 decided as the copy destination of the restored data at step SP100 (SP107).

Contrarily, when the FM controller 42 obtains a negative result in the determination at step SP103, it requests the FM adapter 38 to send the RAID group information of the RAID group 61 to which the failed FM chip 20 belongs, and acquires such information (SP104).

Thereafter, the FM controller 42 requests the corresponding FM module 11 to read data necessary in restoring one block worth of data of the failed FM chip 20 from the FM chip 20 configuring the same RAID group 61 as the failed FM chip 20 via the FM adapter 38 based on this RAID group information, and to send it to the self-system FM module 11 (SP105).

When the necessary data of all other FM modules 11 is transferred via the FM adapter 38, the FM controller 42 of the spare FM module 11 restores one block worth of data stored in the failed FM chip 20 based on such data (SP106), and writes the obtained restored data in the FM chip 20 decided at step SP100 in the self-system FM module 11 (SP107).

Subsequently, the FM controller 42 updates the value set as the address of the block of the write destination of the restored data in the FM chip 20 to the subsequent address of the block in which the restored data was written at step SP75 (SP108).

Thereafter, the FM controller 42 determines whether the foregoing correction copy of all blocks in the failed FM chip 20 is complete (SP109). The FM controller 42 returns to step SP102 upon obtaining a negative result in this determination, and thereafter repeats the processing at step SP102 to step SP109 until the same processing for all blocks in the failed FM chip 20 is complete.

Further, when the FM controller 42 eventually completes the data copy based on dynamic sparing of all blocks in the failed FM chip 20, it sends chip information to the storage controllers 31A, 31B to the effect that the spare FM chip 20 storing the restored data will be used instead of the failed FM chip 20 (SP110). Incidentally, the FM controller 42 that received this chip information updates the address of the block written with original data in the spare FM chip 20 contained in the chip information to the address of the block written with the restored data. The FM controller 42 thereafter ends this first dynamic sparing processing.

(1-2-3-5) Second Dynamic Sparing Processing

Figure 24:
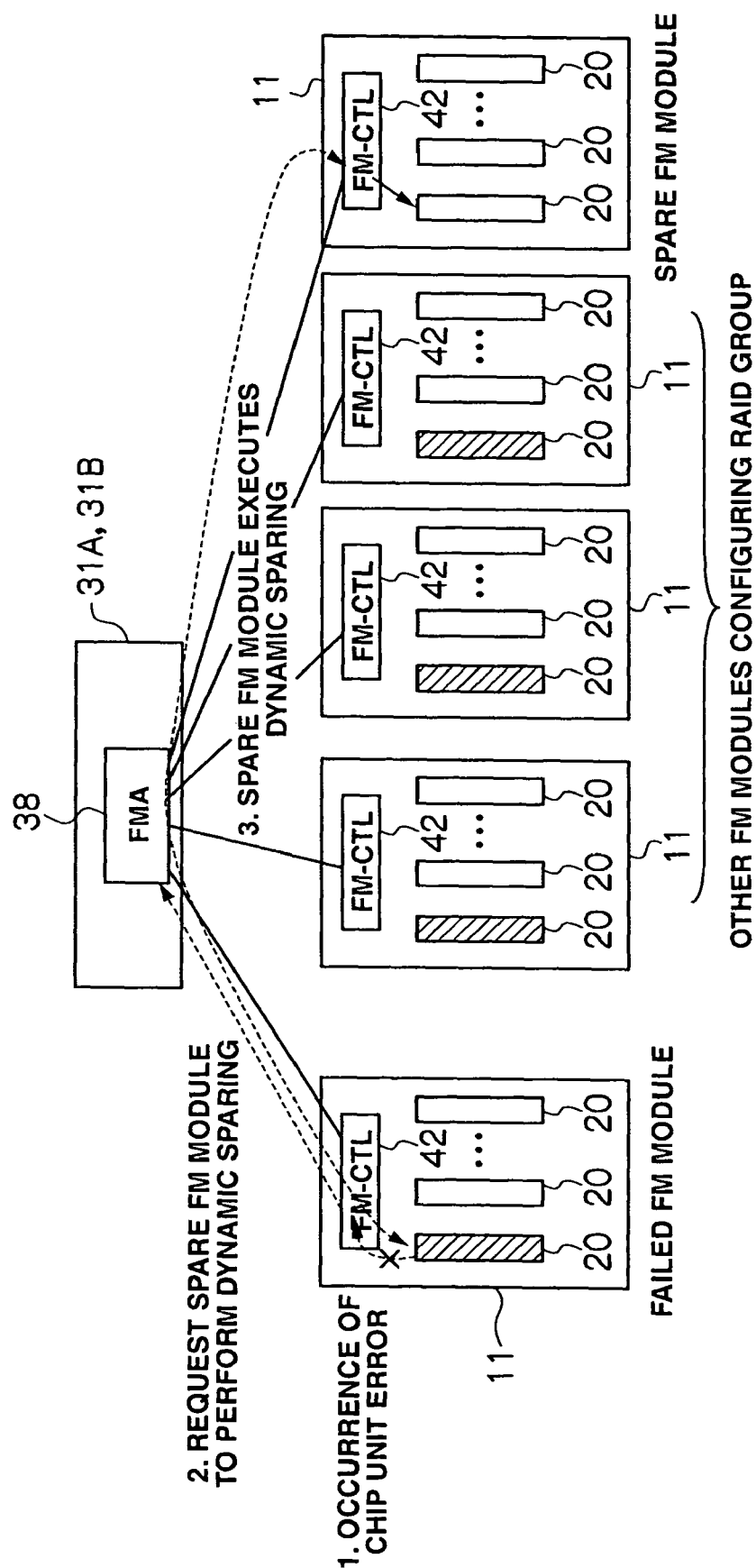
FIG. 24 is a conceptual diagram showing the outline of second dynamic sparing processing.

FIG. 24 shows the outline of the foregoing second dynamic sparing processing. In this second dynamic sparing processing, the FM controller 42 of the spare FM module 11 to become the copy destination writes the data of the failed FM chip 20 in the FM chip 20 of the self-system FM module 11 while restoring such data as needed.

Figure 25:
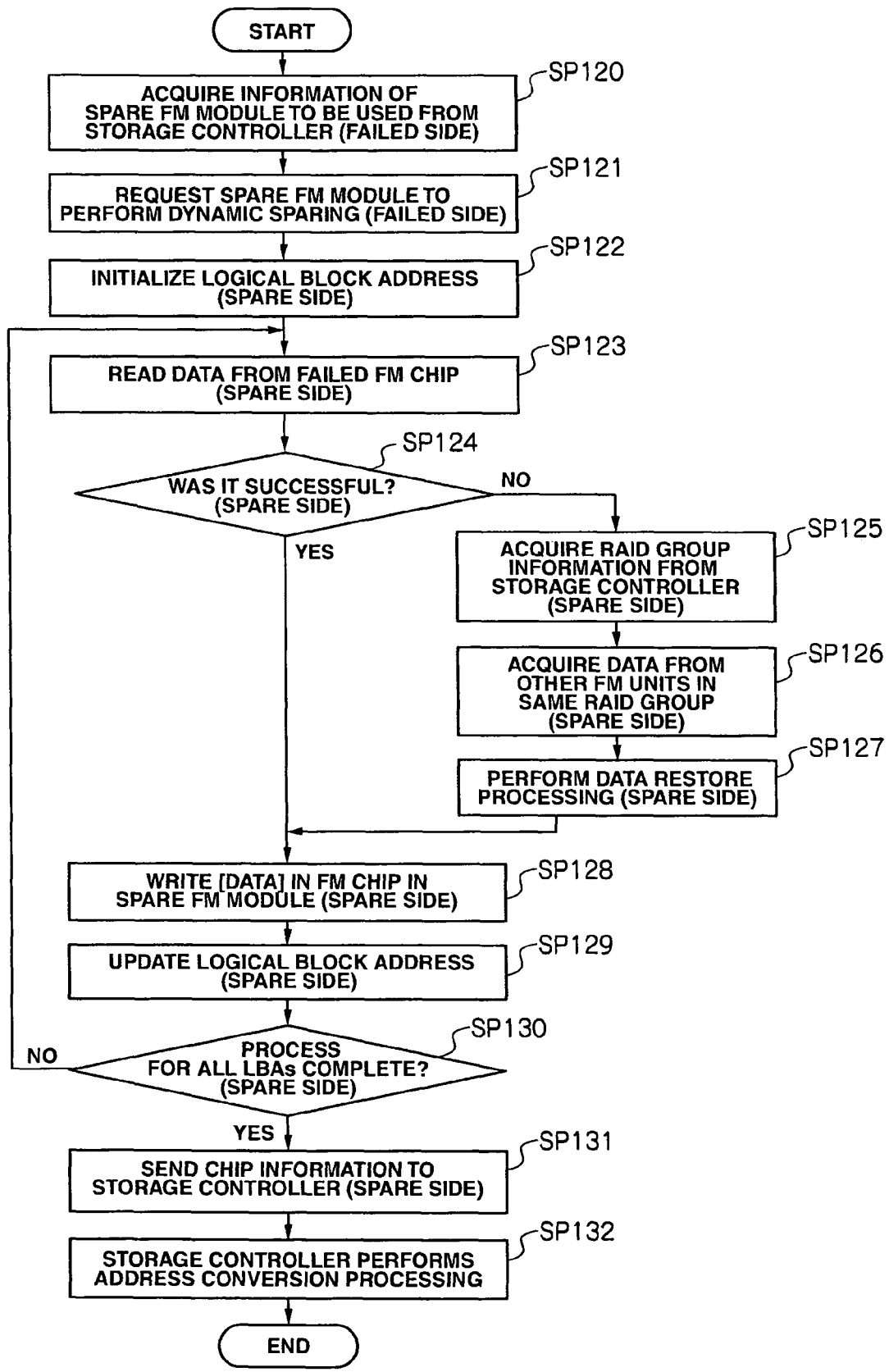
FIG. 25 is a flowchart showing the flow of second dynamic sparing processing.

FIG. 25 is a flowchart showing the specific flow of this second dynamic sparing processing. When the FM controller 42 of the failed FM module 11 proceeds to step SP67 of the failed FM chip data copy processing explained with reference to FIG. 16, it starts the second dynamic sparing processing, and foremost acquires the spare FM module information from the storage controllers 31A, 31B, and selects and decides the spare FM module 11 to become the copy destination of the data stored in the failed FM chip 20 and the FM chip 20 in this spare FM module 11 based on the acquired spare FM module information (SP120).

Then, the FM controller 42 of the failed FM module 11 designates the FM module 11 and the FM chip 20 decided at step SP120 as the FM module 11 and the FM chip 20 of the copy destination to the FM controller 42 of the spare FM module 11 via the FM adapter 38, and requests the dynamic sparing of the data stored in the failed FM chip 20 (SP121).

The FM controller 42 of the spare FM module 11 that received the request of dynamic sparing sets the address of the block (initializes the block address) to start the copy of restored data in the spare FM chip 20 decided as the data copy destination at step SP120 (SP122).

Further, the FM controller 42 of the spare FM module 11 accesses the failed FM module 11 and reads one block worth of data from the failed FM chip 20 (SP123), and thereafter determines whether it was possible to read the data (SP124).

When the FM controller 42 of the spare FM module 11 obtains a positive result in this determination, it writes the read one block worth of data in the FM chip 20 decided as the copy destination at step SP120 (SP128).

Contrarily, when the FM controller 42 of the spare FM module 11 obtains a negative result in this determination, it requests the FM adapter 38 to send the RAID group information of the RAID group 61 to which the failed FM chip 20 belongs, and acquires such information (SP125).

Thereafter, the FM controller 42 of the spare FM module 11 requests each of the corresponding FM modules 11 to read data necessary in restoring one block worth of data of the failed FM chip 20 from the FM chip 20 configuring the same RAID group 61 as the failed FM chip 20 via the FM adapter 38 based on this RAID group information, and send it to the self-system FM module 11 (SP126).

When the necessary data of all other FM modules 11 is transferred via the FM adapter 38, the FM controller 42 of the spare FM module 11 restores one block worth of data stored in the failed FM chip 20 based on such data (SP127), and writes the obtained restored data in the block of the address (address set at step SP72 in the initial stage) set as the data write destination at that time in the FM chip 20 designated as the copy destination at step SP121 (SP128).

Subsequently, the FM controller 42 of the spare FM module updates the value set as the address of the block of the write destination of the restored data in the spare FM chip 20 to the subsequent address of the block in which the restored data was written at step SP128 (SP129).

Thereafter, the FM controller 42 of the spare FM module 11 determines whether the foregoing dynamic sparing for all blocks in the failed FM chip 20 is complete (SP130). The FM controller 42 returns to step SP123 upon obtaining a negative result in this determination, and thereafter repeats the processing at step SP123 to step SP130 until the same processing for all blocks in the failed FM chip 20 is complete.

Further, when the FM controller 42 of the spare FM module 11 eventually completes the correction copy of all blocks in the failed FM chip 20, it sends chip information to the FM adapter 38 to the effect that the spare FM chip 20 storing the restored data will be used instead of the failed FM chip 20 (SP131).

When the FM adapter 38 receives this chip information, it executes address conversion processing for converting the storage destination of the corresponding data into the FM chip 20 in the spare FM module 11 according to such chip information (SP132). This second dynamic sparing processing is thereby ended.

Incidentally, in addition to the method where the FM controller 42 of the spare FM module 11 takes initiative in the second dynamic sparing processing, a method where the FM controller 42 of the failed FM module 11 takes initiative can also be applied.

Figure 26:
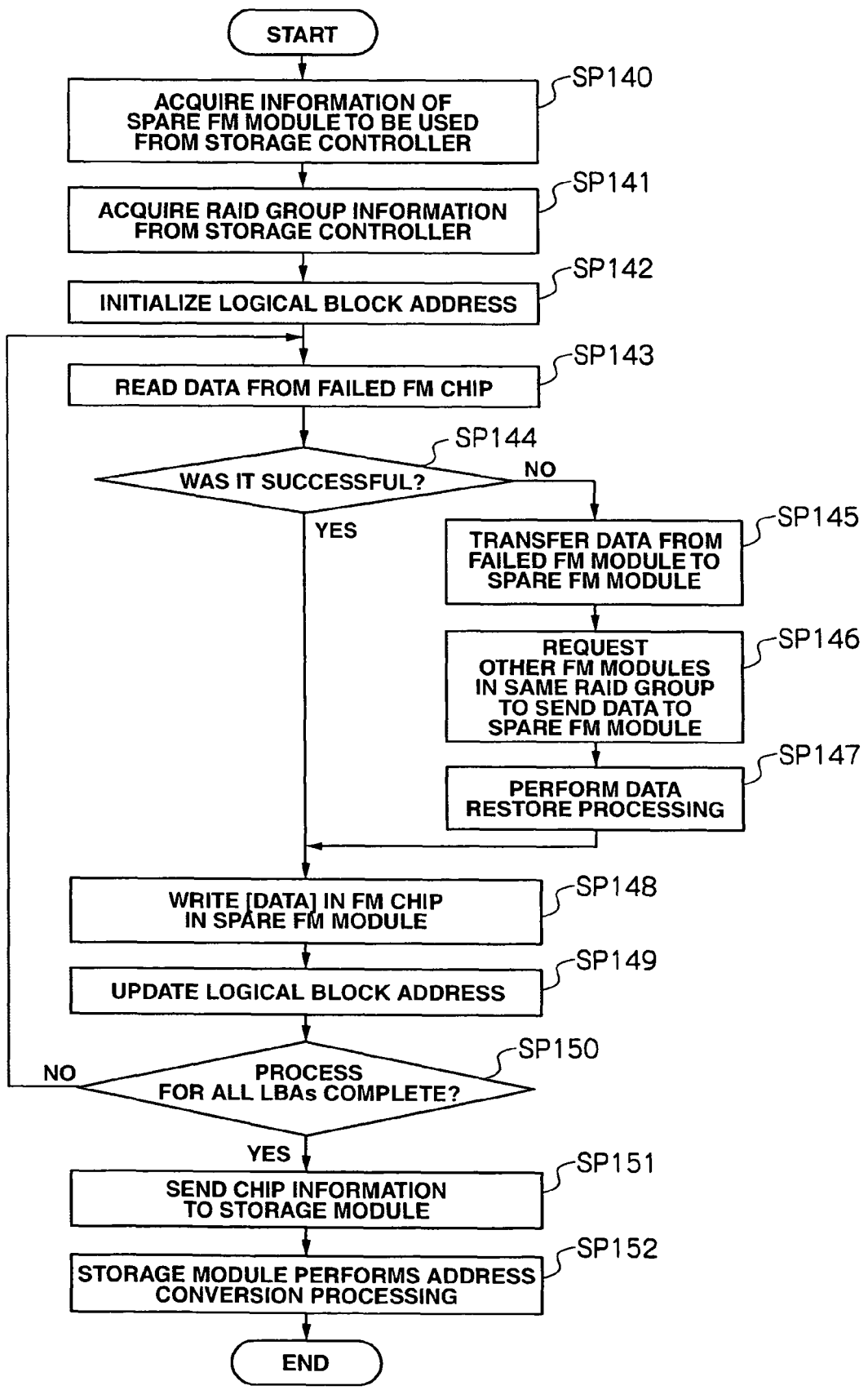
FIG. 26 is a flowchart showing a modified example of second dynamic sparing processing.

FIG. 26 shows the processing routine in the case of the FM controller 42 of the failed FM module 11 taking initiative in the second dynamic sparing processing.

In the foregoing case, the FM controller 42 of the failed FM module 11 foremost acquires the spare FM module information from the FM adapter 38 of the storage controllers 31A, 31B, and selects and decides the spare FM module 11 to become the correction copy destination of the data stored in the failed FM chip 20 and the FM chip 20 in this spare FM module 11 based on the acquired spare FM module information (SP140).

Then, the FM controller 42 of the failed FM module 11 acquires the RAID group information of the RAID group 61 to which the failed FM chip 20 belongs from the FM adapter 38 (SP141), and thereafter sets the address of the block to start the correction copy in the spare FM chip 20 decided as the correction copy destination at step SP140 (SP142).

Thereafter, the FM controller 42 of the failed FM module 11 executes the data read processing for reading one block worth of data from the failed FM chip 20 (SP143), and determines whether the data read processing succeeded (that is, whether it was possible to read data) (SP144).

When the FM controller 42 of the failed FM module 11 obtains a positive result in this determination, it transfers the one block worth of data read from the failed FM chip 20 to the spare FM module 11 decided at step SP140 together with the data write command for writing such data in the FM chip 20 decided as the copy destination at step SP140 via the FM adapter 38 (SP145). Then, the FM controller 42 of the spare FM module 11 that received this data writes such data in the designated FM chip 20 (SP148).

Meanwhile, when the FM controller 42 of the failed FM module 11 obtains a negative result in the determination at step SP144, it requests the corresponding FM module 11 to read data necessary in restoring one block worth of data of the failed FM chip 20 from the FM chip 20 configuring the same RAID group 61 as the failed FM chip 20 via the FM adapter 38 based on the RAID group information acquired at step SP91, and send it together with the data write request for writing such data in the FM chip 20 decided as the copy destination at step SP140 to the spare FM module 11 decided at step SP140 (SP146).

Thereby, the FM controller 42 of each FM module 11 that received the request will read the necessary data from the corresponding FM chip 20, and send this together with the data write request to the designated spare FM module 11 via the FM adapter 38.

Then, the FM controller 42 of the spare FM module 11 that received such data and data write request from each of the corresponding FM modules 11 restores the one block worth of data stored in the failed FM chip 20 based on the foregoing data (SP147), and writes the obtained restored data in the block of the address set as the data write destination at such time in the designated FM chip 20 (SP148).

Thereafter, the FM controller 42 of the failed FM module 11 updates the value set as the address of the block of the write destination of the data in the FM chip 20 to the subsequent address of the block in which data was written at step SP148 (SP149).

Subsequently, the FM controller 42 of the failed FM module 11 determines whether the foregoing dynamic sparing of all blocks in the failed FM chip 20 is complete (SP150). The FM controller 42 returns to step SP143 upon obtaining a negative result in this determination, and thereafter repeats the processing at step SP143 to step SP150 until the same processing for all blocks in the failed FM chip 20 is complete.

Further, when the FM controller 42 of the failed FM module 11 eventually completes the dynamic sparing of all blocks in the failed FM chip 20, it sends chip information to the FM adapter 38 to the effect that the spare FM chip 20 storing the restored data will be used instead of the failed FM chip 20 (SP151).

When the FM adapter 38 receives this chip information, it executes address conversion processing for converting the storage destination of the corresponding data into the FM chip 20 in the spare FM module 11 according to such chip information (SP152). This second dynamic sparing processing is thereby ended.

(1-2-4) Data Write Processing and Data Read Processing

The specific processing contents of the data write processing and the data read processing in view of the foregoing correction copy function and the dynamic sparing function performed in the storage system 1 according to the present embodiment are now explained.

Figure 27:
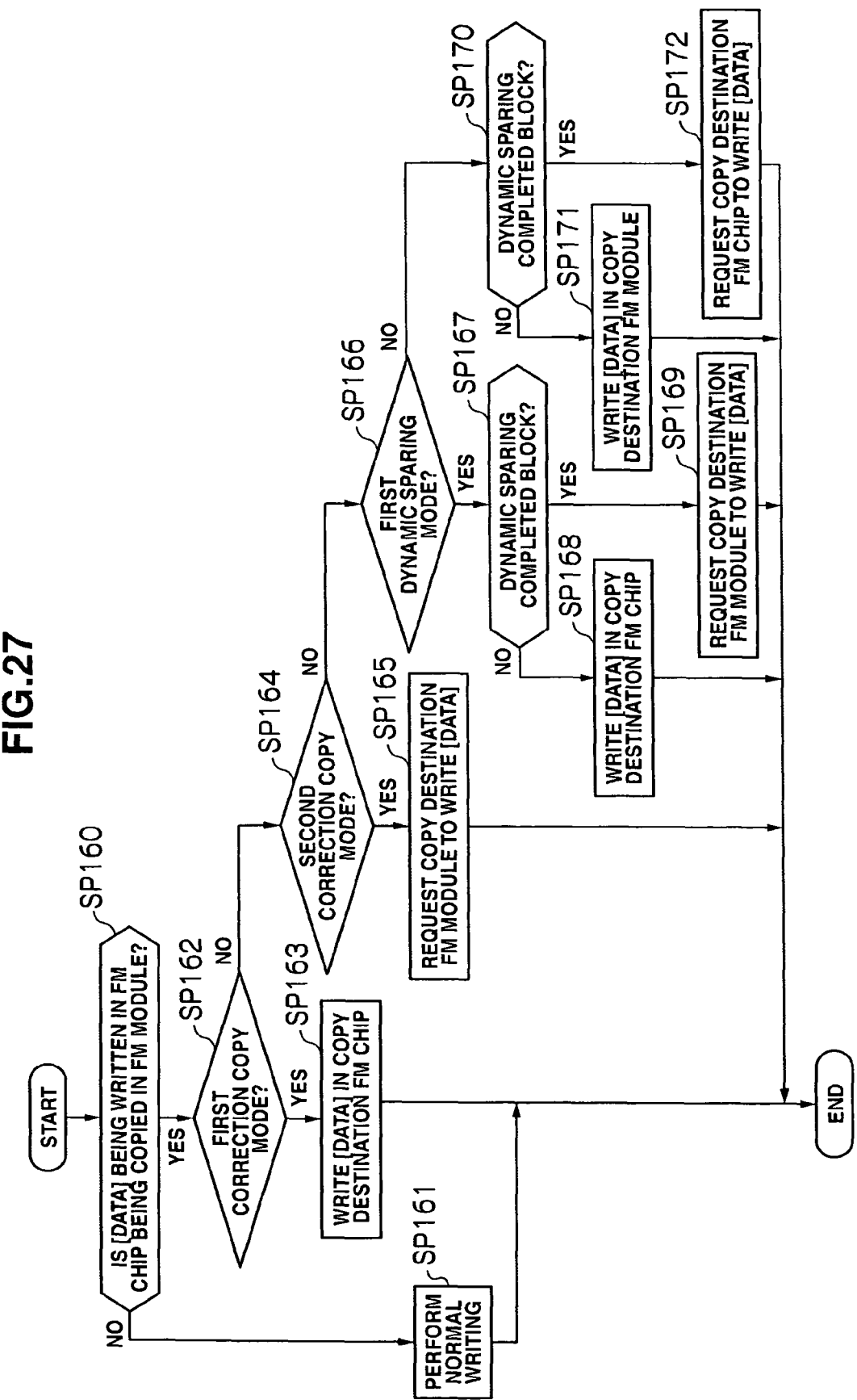
FIG. 27 is a flowchart showing the processing routine of data write processing.

FIG. 27 is a flowchart showing the specific contents of the data write processing performed at step SP9 of the data write/table update processing explained with reference to FIG. 13 and FIG. 14.

When the FM controller 42 of the FM module 11 proceeds to step SP9 of the data write/table update processing, it starts this data write processing, and foremost determines whether the FM chip 20 of the write destination of the write-target data is the FM chip 20 currently being copied based on the foregoing correction copy function or the dynamic sparing function (SP160).

When the FM controller 42 obtains a negative result in this determination, it performs normal data write processing (SP161), thereafter ends this data write processing, and returns to the data write/table update processing.

Contrarily, when the FM controller 42 obtains a positive result in the determination at step SP160, it determines whether the copy mode of such copy is the first correction mode (SP162). When the FM controller 42 obtains a positive result in this determination, it writes the write-target data in the corresponding block in the FM chip 20 of the copy destination in the self-system FM module 11 (SP163). The FM controller 42 thereafter ends this data write processing, and returns to the data write/table update processing.

Further, when the FM controller 42 obtains a negative result in the determination at step SP162, it determines whether the copy mode of such copy is the second correction mode (SP164). When the FM controller 42 obtains a positive result in this determination, it sends the write-target data to the FM module 11 of the copy destination together with the data write request designating the address of the write destination (SP165). The FM controller 42 thereafter ends this data write processing, and returns to the data write/table update processing.

Moreover, when the FM controller 42 obtains a negative result in the determination at step SP166, it determines whether the copy mode of such copy is the first dynamic sparing mode (SP166). When the FM controller 42 obtains a positive result in this determination, it determines whether the block in which the write-target data is to be written is a block that has been subject to the dynamic sparing processing (SP167).

When the FM controller 42 obtains a positive result in this determination, it writes the write-target data in the corresponding block in the FM chip 20 of the copy source in the self-system FM module 11 (SP168). The FM controller 42 thereafter ends this data write processing, and returns to the data write/table update processing.

Contrarily, when the FM controller 42 obtains a negative result in the determination at step SP167, it sends the write-target data to the FM module 11 of the copy destination together with the data write request designating the address of the write destination (SP169). The FM controller 42 thereafter ends this data write processing, and returns to the data write/table update processing.

Further, when the FM controller 42 obtains a negative result in the determination at step SP166, it determines whether the block in which the write-target data is to be written is a block that has been subject to the dynamic sparing processing (SP170).

When the FM controller 42 obtains a positive result in this determination, it sends the write-target data to the FM module 11 of the copy destination together with the data write request designating the address of the write destination (SP171), and then ends this data write processing. The FM controller 42 thereafter ends this data write processing, and returns to the data write/table update processing.

Contrarily, when the FM controller 42 obtains a negative result in the determination at step SP170, it writes the write-target data in the corresponding block in the FM chip of the copy source in the self-system FM module 11 (SP172). The FM controller 42 thereafter ends this data write processing, and returns to the data write/table update processing.

Figure 28:
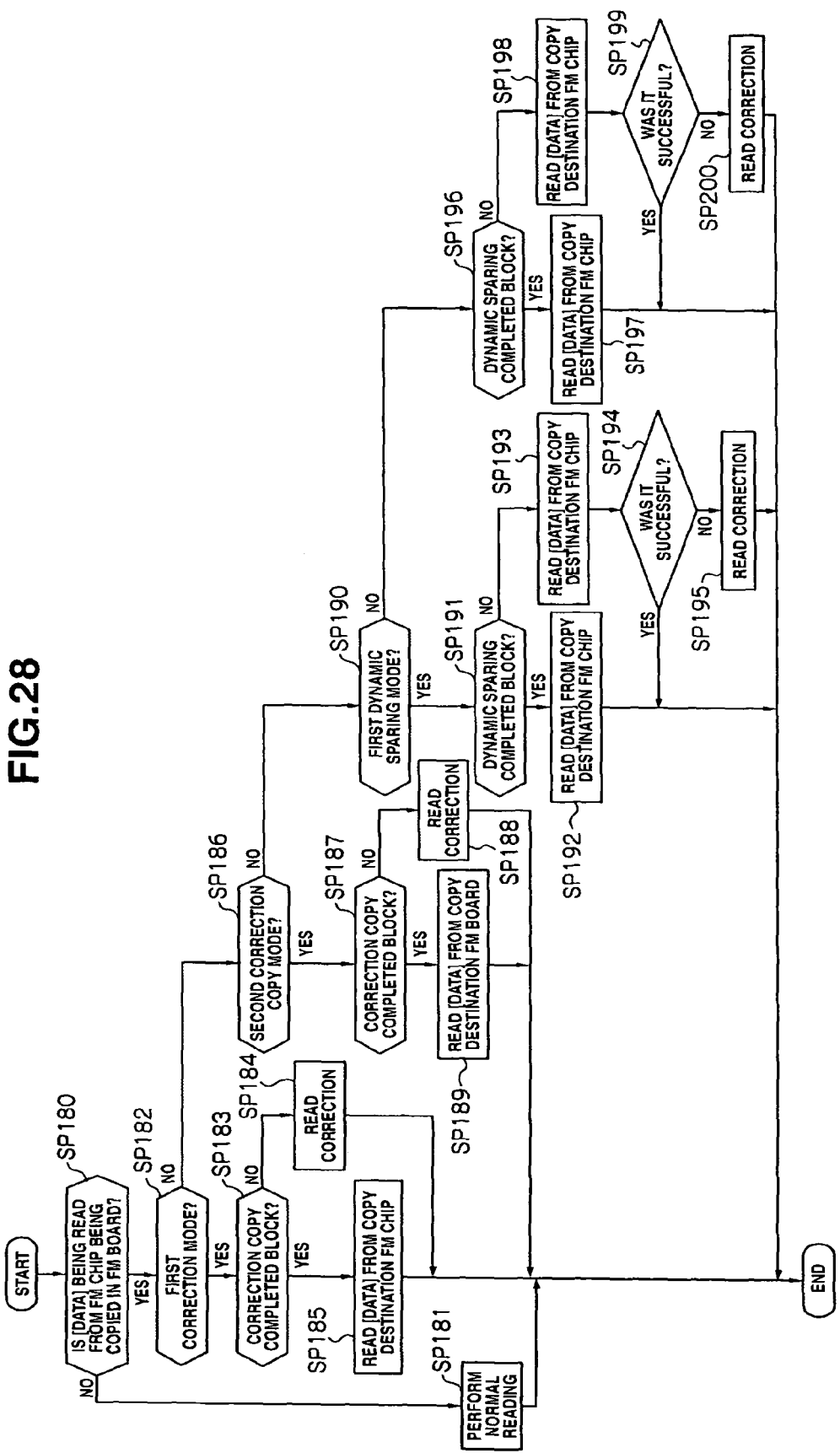
FIG. 28 is a flowchart showing the processing routine of data read processing.

Meanwhile, FIG. 28 is a flowchart showing the specific contents of the data read processing to be performed at step SP39 of the data read/table update processing explained with reference to FIG. 15.

When the FM controller 42 of the FM module 11 proceeds to step SP39 of the data read/table update processing, it starts this data read processing, and foremost determines whether the FM chip 20 storing the read-target data is the FM chip 20 currently being copied based on the foregoing correction copy function or the dynamic sparing function (SP180).

When the FM controller 42 obtains a negative result in this determination, it performs normal data read processing (SP181), thereafter ends this data read processing, and returns to the data read/table update processing.

Contrarily, when the FM controller 42 obtains a positive result in the determination at step SP250, it determines whether the copy mode of such copy is the first correction mode (SP182). When the FM controller 42 obtains a positive result in this determination, it determines whether the block storing the data to be read is a block that has been subject to correction copy (SP183).

When the FM controller 42 obtains a negative result in this determination, it restores the original data based on the same processing as step SP73 and step SP74 of the first correction copy processing explained with reference to FIG. 18 (SP184). The FM controller 42 thereafter ends this data read processing, and returns to the data read/table update processing.

Contrarily, when the FM controller 42 obtains a positive result in the determination at step SP183, it reads data from the FM chip 20 of the copy destination, and sends this data to the storage controllers 31A, 31B (SP185). The FM controller 42 thereafter ends this data read processing, and returns to the data read/table update processing.

Further, when the FM controller 42 obtains a negative result in the determination at step SP252, it determines whether the copy mode of such copy is the second correction mode (SP186). When the FM controller 42 obtains a positive result in this determination, it thereafter acquires the read-target data based on the same processing as step SP183 to step SP185 (SP187 to SP189). The FM controller 42 thereafter ends this data read processing, and returns to the data read/table update processing.

Meanwhile, when the FM controller 42 obtains a negative result in the determination at step SP186, it determines whether the copy mode of such copy is the first dynamic sparing mode (SP190). When the FM controller 42 obtains a positive result in this determination, it determines whether the block in which the data to be read is a block that has been subject to copying based on dynamic sparing (SP191).

When the FM controller 42 obtains a positive result in this determination, it reads data from the FM chip 20 of the copy destination, and sends this data to the storage controllers 31A, 31B (SP192). The FM controller 42 thereafter ends this data read processing, and returns to the data read/table update processing.

Contrarily, when the FM controller 42 obtains a negative result in this determination, it executes data read processing for reading the read-target data from the FM chip (that is, the failed FM chip) 20 of the copy source (SP193).

Then, the FM controller 42 determines whether it was possible to read the read-target data based on the data read processing (SP194), and sends the read data to the storage controllers 31A, 31B upon obtaining a positive result. The FM controller 42 thereafter ends this data read processing, and returns to the data read/table update processing.

Contrarily, when the FM controller 42 obtains a negative result in the determination at step SP194, it restores the original data as per the processing at step SP184 (SP195). The FM controller 42 thereafter ends this data read processing, and returns to the data read/table update processing.

Meanwhile, when the FM controller 42 obtains a negative result in the determination at step SP190, it acquires the read-target data as with the processing at step SP191 to step SP195 (SP196 to SP200). The FM controller 42 thereafter ends this data read processing, and returns to the data read/table update processing.

Figure 29:
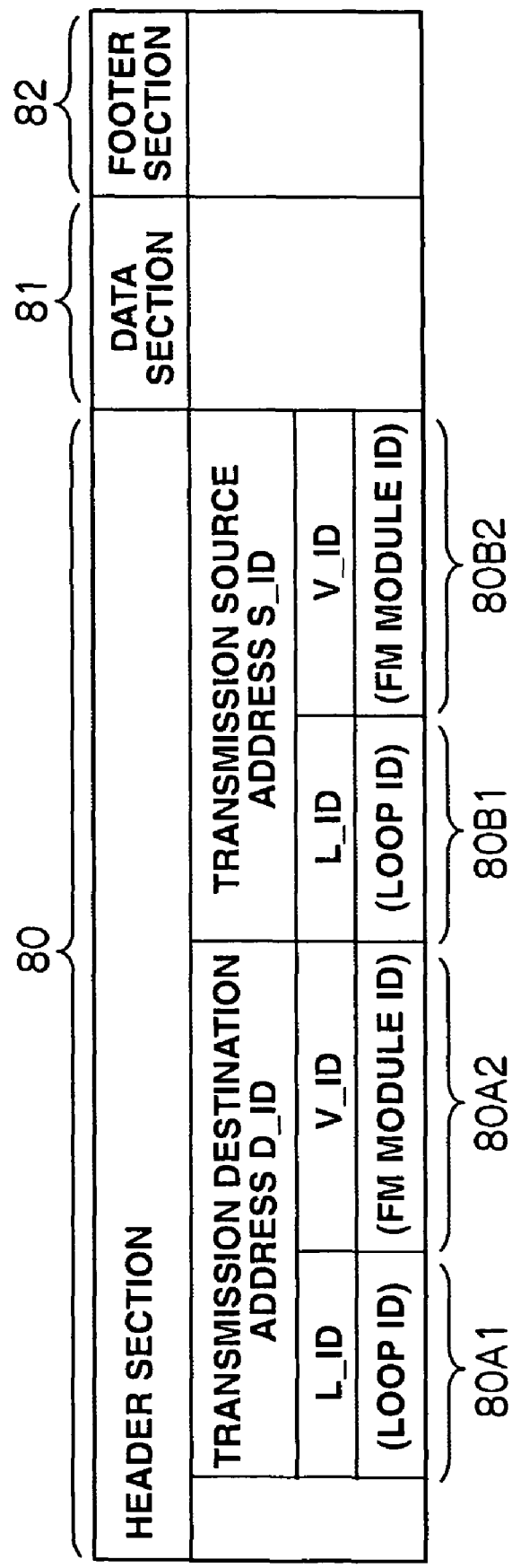
FIG. 29 is a conceptual diagram explaining the data format upon sending write-target data from the FM controller to an FM module of the copy destination.

Incidentally, FIG. 29 shows the data format of the read-target data or the write-target data to be transferred via the FM adapter 38 as explained with reference to FIG. 17 to FIG. 28.

In the case of the present embodiment, the read-target data or the write-target data is stored in the data section 81 of FIG. 29, and a header section 80 and a footer section 82 are respectively added to the front and back of the data section 81. The header section 80 stores the identification number (loop ID) of the FC loop 25 (FIG. 5) connected to the destination FM module 11 and the identification number (FM module ID) of the destination FM module 11 as the destination address information, and the identification number of the FC loop 25 connected to the source FM module 11 and the identification number of the source FM module 11 as the source address information.

(1-3) Effect of Present Embodiment

In the foregoing configuration, when a failure occurs in the FM chip 20 of the self-system FM module 11, the FM controller 42 of the FM module 11 decides the FM chip 20 to become the copy destination of the data stored in the FM chip (failed FM chip) 20, and copies the data stored in the failed FM chip to the FM chip 20 decided as the copy destination.

Accordingly, with this storage system 1, since the data migration from the failed FM chip 20 is conducted by the FM controller 42 of the failed FM module 11 or the FM module 11 of the copy destination taking initiative, the load of the storage controllers 31A, 31B (FM adapter 38) will not increase. Thus, it is possible to migrate the data in a failed FM chip 20 to another FM chip without inflicting an adverse effect such as deteriorating the performance of other processing such as the data I/O processing in the storage system 1.

According to the foregoing configuration, it is possible to realize a storage system capable of effectively dealing with the foregoing issues while preventing performance deterioration.

(2) Second Embodiment

In the first embodiment described above, a case was explained where the foregoing first and second correction copy processing were performed by the FM controller 42 of the failed FM module 11 or the FM controller 42 of the spare FM module 11 requested to perform correction copy processing taking initiative independently from the storage controllers 31A, 31B.

Figure 30:
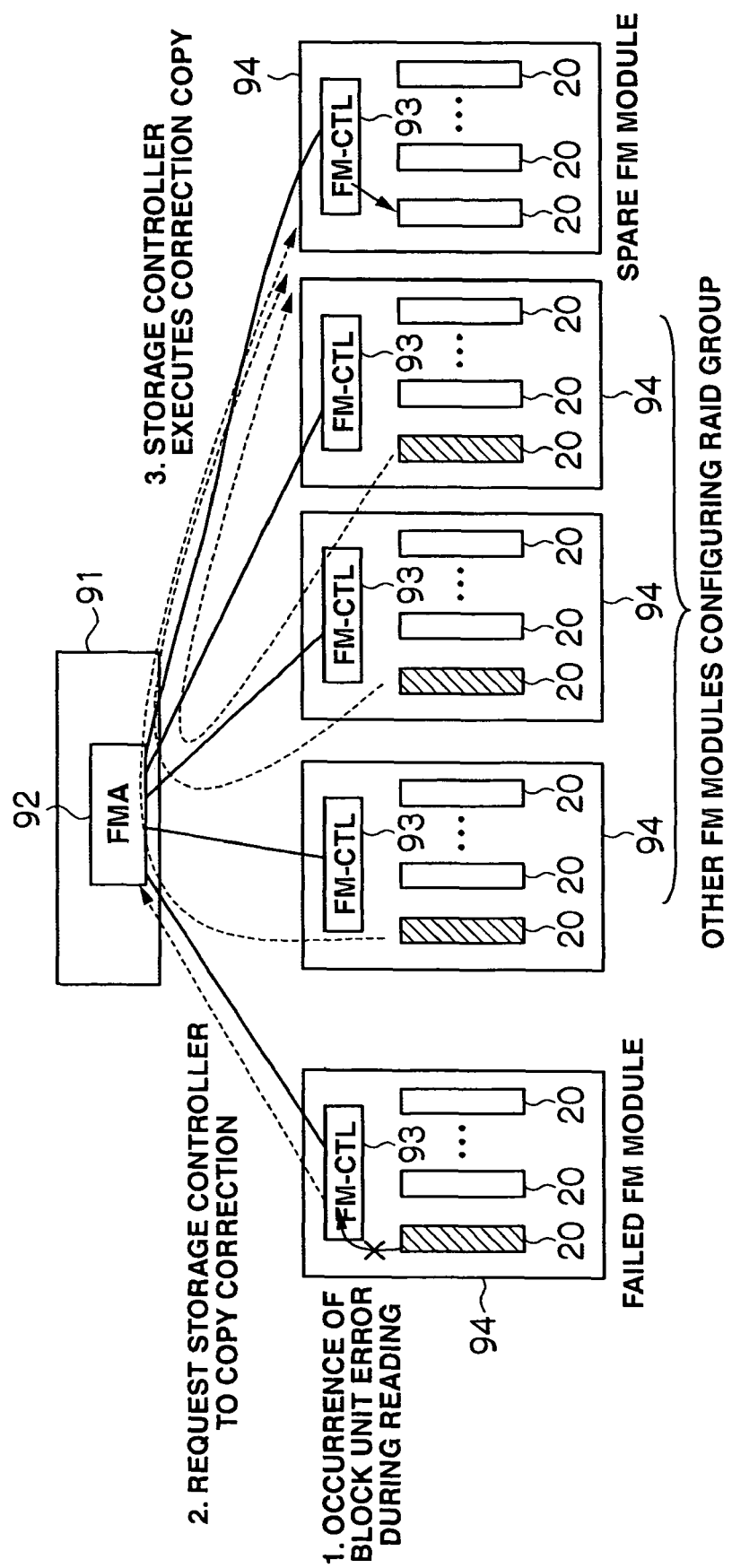
FIG. 30 is a conceptual diagram showing the outline of correction copy processing according to another embodiment of the present invention.

Contrarily, with the storage system 90 (FIG. 1, FIG. 6) according to the second embodiment, as shown in FIG. 30, when a failure occurs in the FM chip 20 in the self-system FM module 93, the FM controller 93 of the FM module 94 requests the FM adapter 92 to perform correction copy from the failed FM chip 20 to the FM chip 20 of the same or another FM module 94, and the FM adapter 92 takes initiative in executing the correction copy processing.

Figure 31:
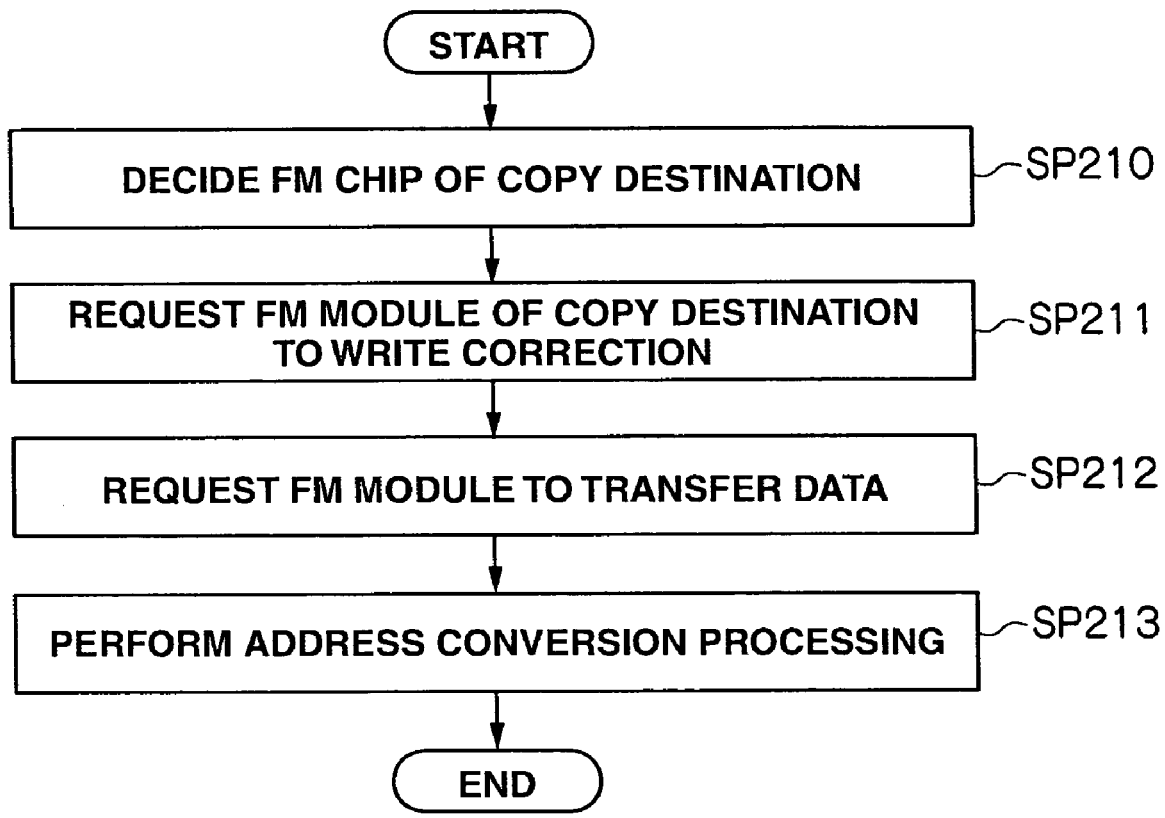
FIG. 31 is a flowchart showing the processing contents of a microprocessor in the correction copy processing illustrated in FIG. 30.

FIG. 31 is a flowchart showing the processing contents of the FM adapter 92 (FIG. 30) of the storage controller 91 that received such request for performing correction copy processing.

When the FM adapter 92 receives a correction copy processing request from any one of the FM modules (failed FM modules) 94, it starts the correction copy processing, and foremost decides the FM chip 20 to become the copy destination of the data stored in the failed FM chip 20 (SP210).

Specifically, when the failed FM module 94 in the first correction copy mode, the FM adapter 92 makes an inquiry to the failed FM module 94 concerning information on the spare FM chip 20 in the failed FM module 94, and, when spare FM chips 20 exist, it decides one among such spare FM chips 20 as the copy destination. Further, when the failed FM module 94 is in the first correction copy mode, the FM adapter 92 decides the spare FM module 94 of the copy destination and the FM chip 20 in the spare FM module 94 based on the spare FM module information that it is personally retaining.

Subsequently, the FM adapter 92 restores the data stored in the failed FM chip 20 based on the data read from the other FM chip 20 configuring the same RAID group 61 as the failed FM chip 20, and requests the FM module (failed FM module or spare FM module) 94 of the copy destination to perform the correction write processing for writing such data in the FM chip 20 decided at step SP210 (SP211).

Thereafter, the FM adapter 92 reads the corresponding data from the FM chip 20 into the FM controller 93 of each FM module 94 with such other FM chip 20 built therein, and sends a data transfer request for transferring this data to the FM module 94 decided at step SP210 (SP212).

When the FM adapter 92 thereafter ends this correction copy processing, it executes address conversion processing of converting the storage destination of the corresponding data into the FM chip 20 in the spare FM module 94 (SP213), and thereafter ends this correction copy processing.

Like this, with the storage system 90 of the second embodiment, since the FM adapter 92 takes initiative in performing the first and second correction copy processing, the processing performance of the FM adapter 92 is high, and, in a case where the data migration from the failed FM module 94 to another FM module 94 will not be a great load on the FM adapter 92, it is possible to the alleviate the processing load of the FM controller 93 of the failed FM module 94 and the FM controller 93 of the spare FM module 94. Thereby, it is possible to effectively prevent the deterioration in the data read/write performance of the FM module 94 caused by the increased load resulting from the data migration from the failed FM module 94 to another FM module 94.

(3) Third Embodiment

Figure 32:
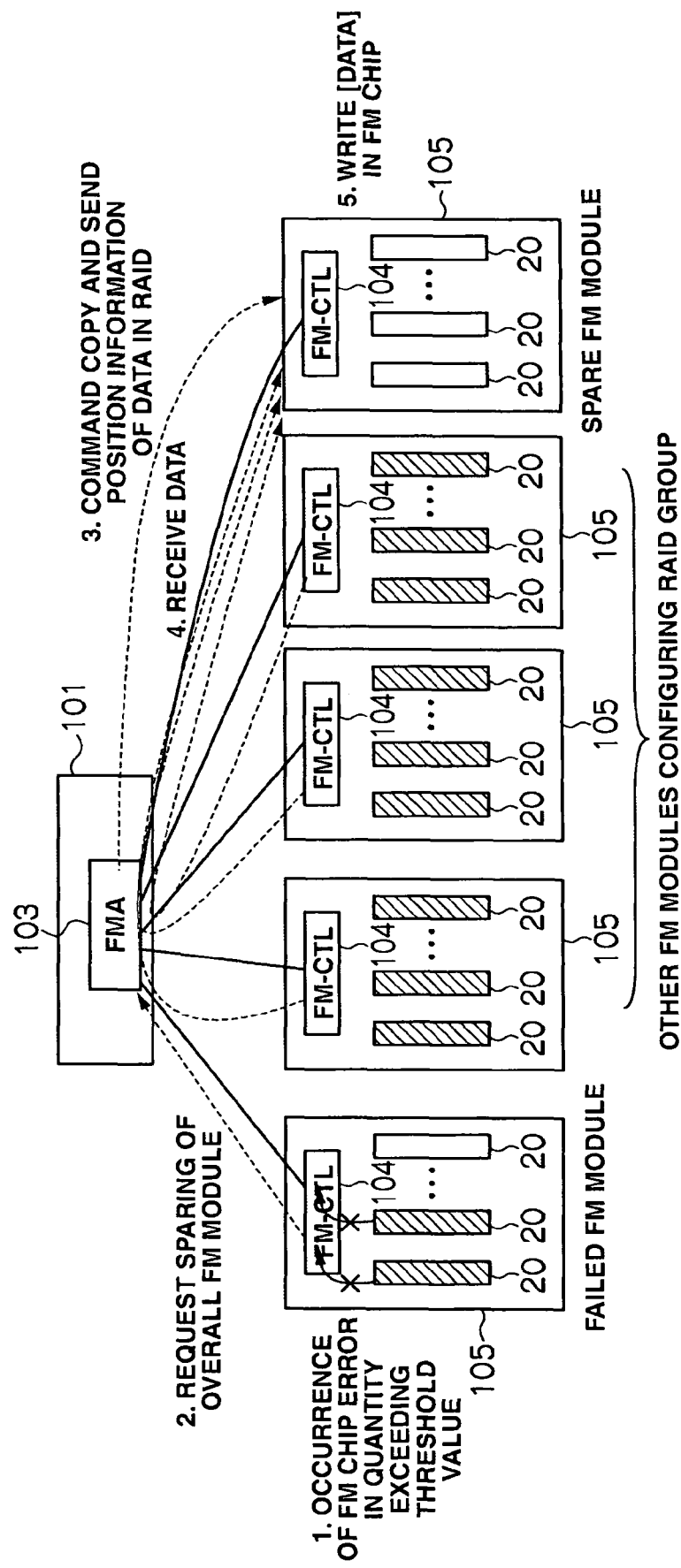
FIG. 32 is a conceptual diagram showing the outline of copy processing in FM module units according to yet another embodiment of the present invention.

With the storage system 1 of the first embodiment, although correction copy and dynamic sparing were performed in FM chip 20 units, with the storage system 100 (FIG. 1, FIG. 6) according to the present embodiment, in addition to the above, as shown in FIG. 32, when a failure occurs in the FM chip 20 in a number exceeding a predetermined threshold value (this is hereinafter referred to as a "failure chip quantity threshold value") in the FM module 105, correction copy and dynamic sparing are performed in FM module 105 units.

Figure 33:
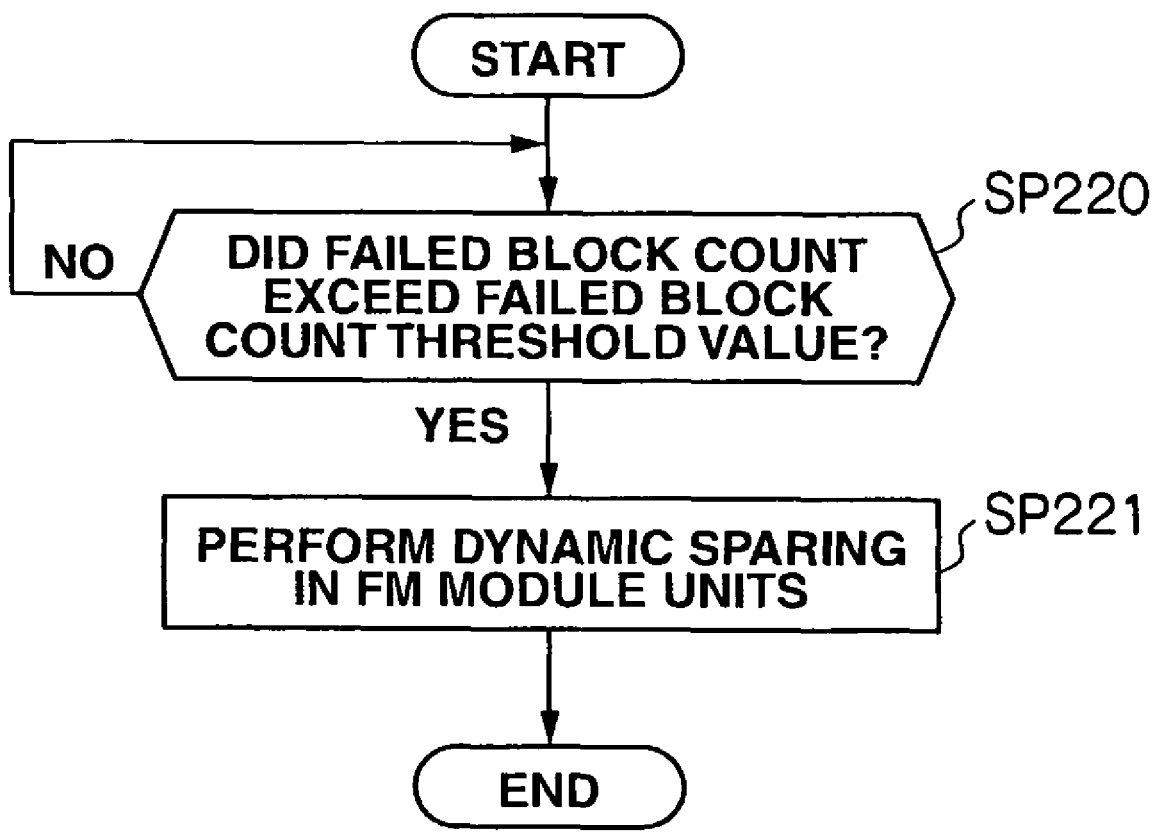
FIG. 33 is a flowchart showing the processing contents of an FM controller in the copy processing illustrated in FIG. 32.

FIG. 33 is a flowchart showing the processing contents of the FM controller 104 of the failed FM module 105 concerning the copy processing (this is hereinafter referred to as "FM module copy processing") to be performed in FM module 105 units.

The FM controller 104 is constantly monitoring the failed FM chip quantity in the self-system FM module 105 based on the chip management table 64 explained with reference to FIG. 10 (SP210), and, when this failed FM chip quantity exceeds the failure chip quantity threshold value, it requests the FM adapter 103 of the storage controller 101 to copy all data in the self-system FM module 105 to the spare FM module 105 through correction copy processing or dynamic sparing processing (SP221), and thereafter ends this FM module copy processing.

Meanwhile, the FM adapter 103 that received this FM module copy processing request commands the FM controller 104 of the spare FM module 105 to become the copy destination to copy all data in the FM module (failed FM module) 105 requesting the FM module copy processing to the spare FM module 105 through correction copy processing or dynamic sparing processing. Further, thereupon, the FM adapter 103 sends to the FM controller 104 of the spare FM module 11 position information (address of corresponding data in the other FM module 105 configuring the RAID group as the failed FM module 105) of data necessary for restoring each data in the failed FM module 105 to the FM controller 104 of the spare FM module 105.

The FM controller 104 of the spare FM module 105 that received this command requests the FM controller 104 of the corresponding module 105 to send the necessary data via the FM adapter 103 based on the position information of the corresponding data provided from the FM adapter 103. When necessary data is sent from each corresponding FM module 105 according to this request, the FM controller 104 of the spare FM module 105 restores the data stored in the failed FM module 105 based on this data, and stores it in the FM chip 20 of the self-system FM module 105. When the FM controller 104 of the spare FM module 105 completes the correction copy processing or dynamic sparing processing of all data stored in the failed FM module 105, it ends the FM module copy processing.

As described above, with the storage system 100 according to the present embodiment, since copy is also performed in FM module 105 units where the failed FM chip quantity exceeds the failed FM chip quantity threshold value, although the load of the FM adapter 103 during that period will increase, it is possible to obtain high reliability in the protection of data.

(4) Other Embodiments

Figure 34:
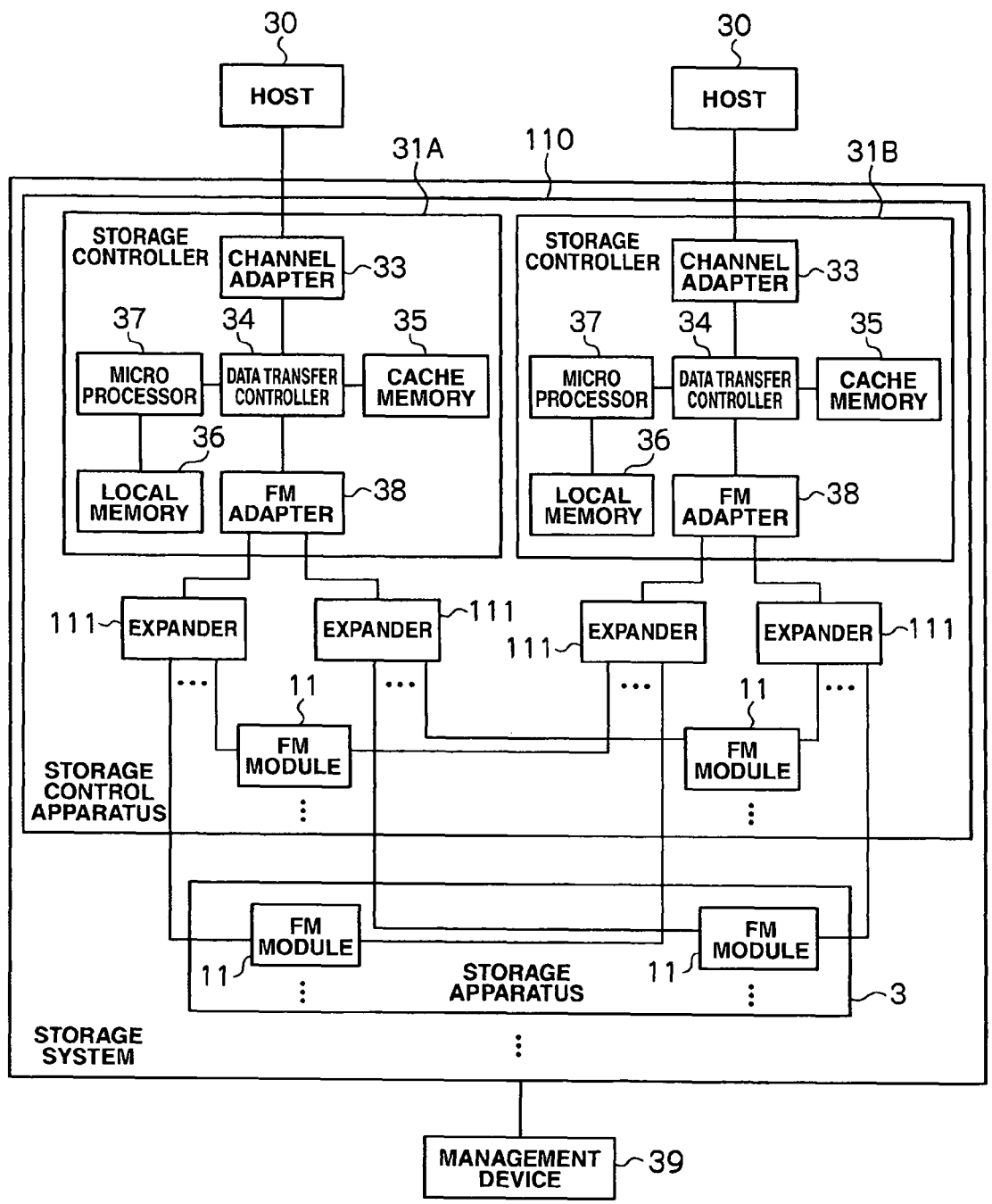
FIG. 34 is a block diagram explaining yet another embodiment of the present invention.

Incidentally, in the first to third embodiments described above, although a case was explained where the FM modules 11 were connected to the FM adapter 38 of the storage controllers 31A, 31B serially and in a loop, the present invention is not limited thereto, and, for instance, as shown in FIG. 34 where the same reference numeral is given to the same components as those illustrated in FIG. 6, an expander 111 may be used to connect each FM module 11 to the FM adapter 38 of the storage controller 110 in parallel.

Figure 35:
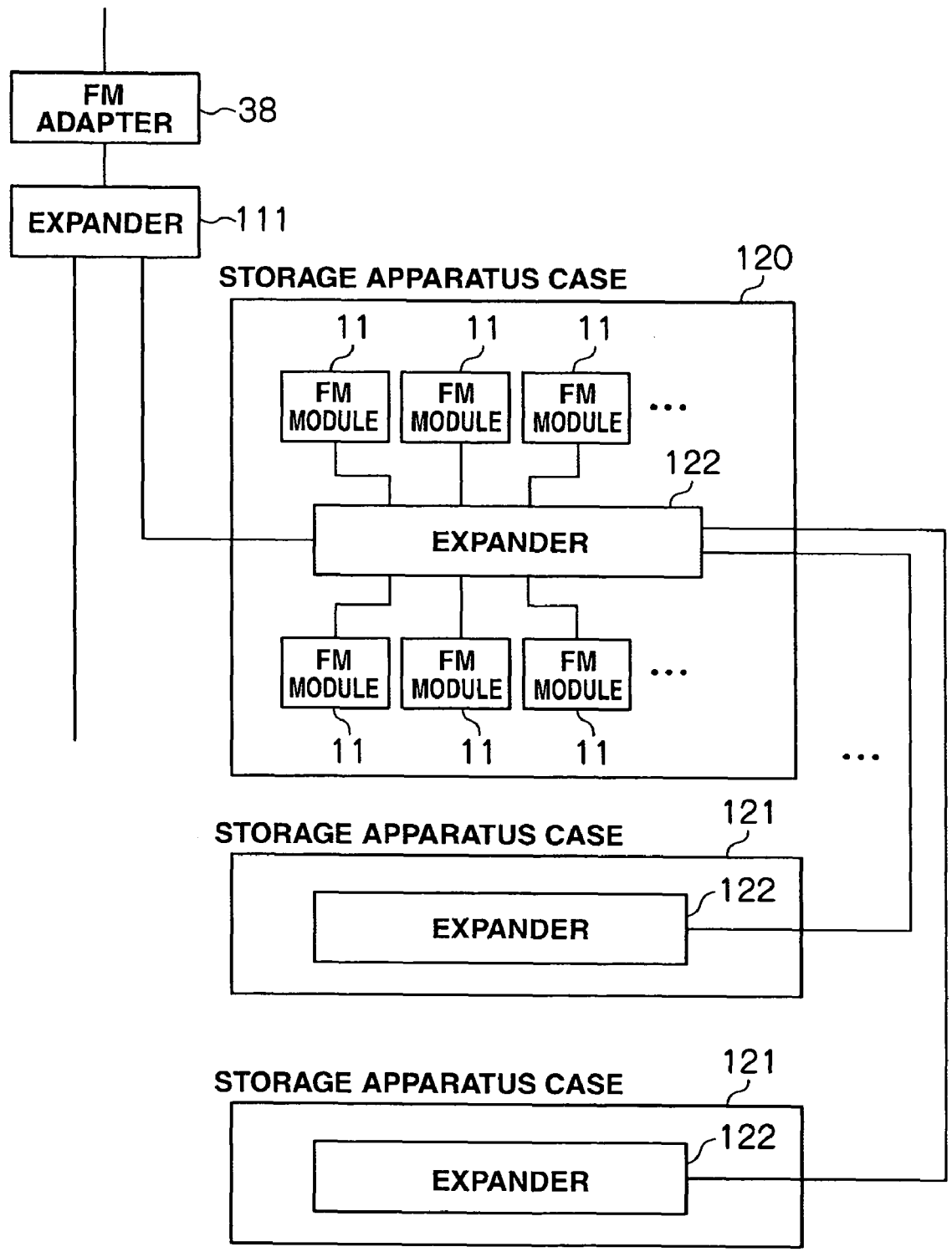
FIG. 35 is a block diagram explaining yet another embodiment of the present invention.

In the foregoing case, as shown in FIG. 35, it is also possible to arrange an expander 122 in the storage control apparatus 120 or each storage apparatus 121, and connect the storage control apparatus 120 and each storage apparatus 121, and connect the storage control apparatus 120 and each FM module 11 in each storage apparatus 121 through these expanders 122.

Figure 36:
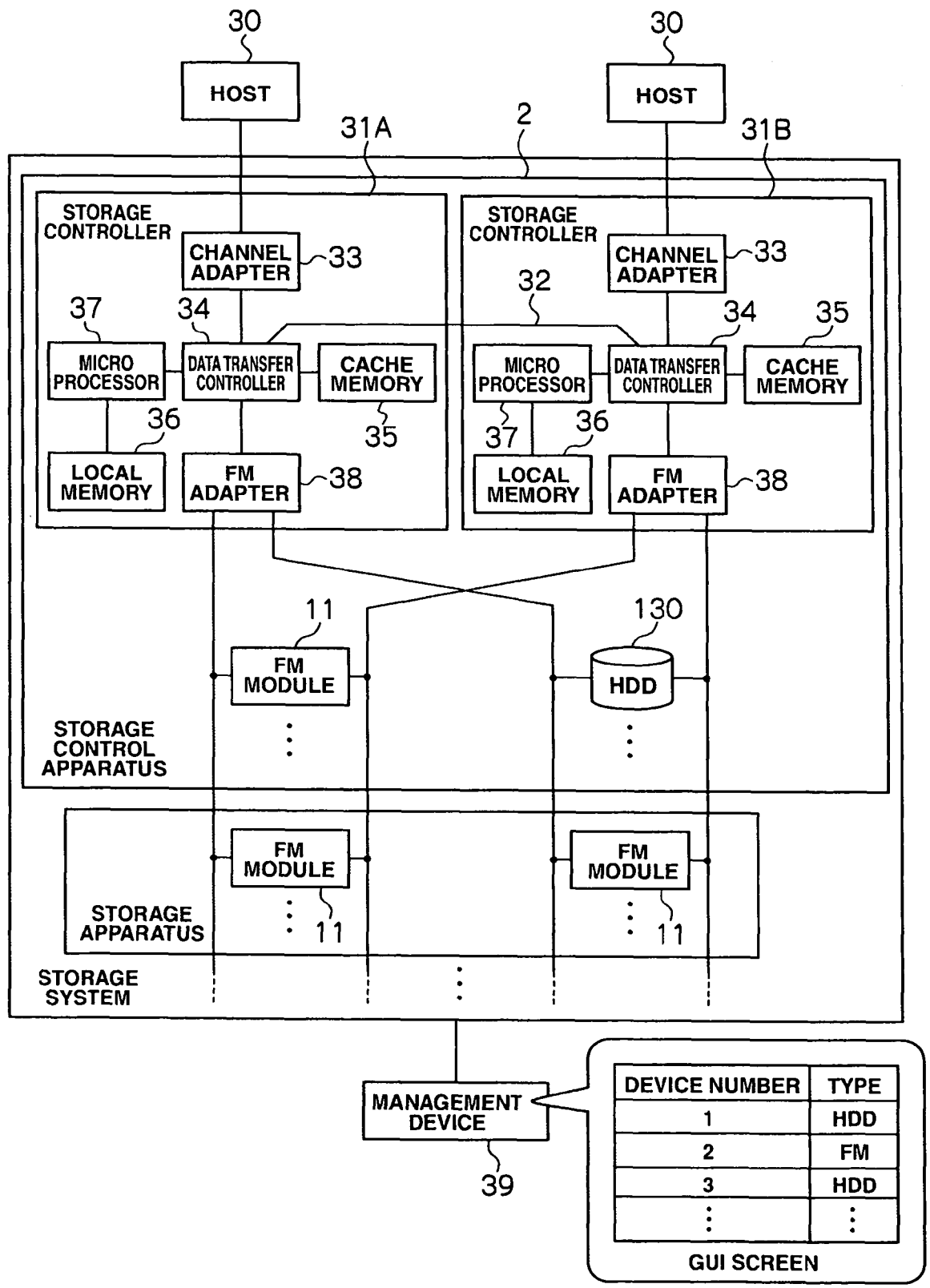
FIG. 36 is a block diagram explaining yet another embodiment of the present invention.

Further, in the first to third embodiments described above, although a case was explained where only the FM module 11 was mounted on the storage control apparatus 2 and each storage apparatus 3, the present invention is not limited thereto, and, for instance, as shown in FIG. 36 where the same reference numeral is given to the same components as those illustrated in FIG. 6, the FM module 11 and the hard disk drive 130 may be consolidated. In the foregoing case, for example, as shown in FIG. 36, if the configuration enables the management unit 39 to confirm which memory device is the FM module 11 and which memory device is the hard disk drive 130, it is possible to facilitate the management of these FM modules 11 and the hard disk drive 130.

Further, in the first to third embodiments described above, although a case was explained where a flash memory is used as the nonvolatile memory, the present invention is not limited thereto, and various other types of nonvolatile memories may be broadly used.

Further, in the third embodiment described above, although a case was explained where correction copy and dynamic sparing are performed in FM module 105 units when a failure occurs in the FM chip 20 in a quantity exceeding the failure chip quantity threshold value in the FM module 105, the present invention is not limited thereto, and, for instance, the correction copy and dynamic sparing may also be performed in FM module 105 units when a link failure occurs between the FM adapter 103 of the storage controller 101 and the FM module 105. In the foregoing case, the correction copy and dynamic sparing may be performed as described above when the FM adapter 103 detects a failure link while monitoring the link status between the respective FM modules 105. In the foregoing case, the FM controller 104 of the spare FM module 105 or the FM adapter 103 may take initiative in performing the correction copy processing and the dynamic sparing processing. The same applied in the third embodiment.

The present invention may be broadly applied to storage systems of various configurations adopting a flash memory as the memory device.

I claim:

1. A storage system providing a storage extent for reading and writing data from and to a host system, comprising:
a plurality of memory modules each including one or more nonvolatile memory chips for respectively providing the storage extent, and a memory controller to control reading and writing data from and to each of one or more of the nonvolatile memory chips of a corresponding of the memory modules, wherein each of the plurality of memory modules is configured to be freely attached to and detached from a baseboard main body as a unit of replacement; and
a storage controller configured to control reading and writing data from and to each of the plurality of memory modules,
wherein at least one of the plurality of memory modules is configured to
determine, when a failure occurs in any one of one or more of the nonvolatile memory chips of the one of the plurality of memory modules, another nonvolatile memory chip in the rest of one or more nonvolatile memory chips of the one of the plurality of modules as a copy destination of data stored in the failed nonvolatile memory chip, and
copy the data stored in the failed nonvolatile memory chip to the another nonvolatile memory chip of the one of the plurality of memory modules determined as the copy destination, wherein the memory controller in the one of the plurality of memory modules is configured to detect an error occurrence at each of the nonvolatile memory chips of the one of the plurality of memory modules, and is further configured to enable selection of, based on whether data stored in the failed nonvolatile memory chip is restorable or not, and whether there is a spare nonvolatile memory chip in the one of the plurality of memory modules or not, one processing to request a copy correction, in which a memory controller in the one of the plurality of memory modules including the failed nonvolatile memory chip requests to a memory controller in a spare memory module, which belongs to a same group as the one of the plurality of memory modules, to restore and copy data stored in the failed nonvolatile memory chip to a nonvolatile memory chip of the spare memory module, or another processing to request a dynamic sparing, in which the memory controller in a one of the plurality of memory modules including the failed nonvolatile memory chip requests, to a memory controller in the spare memory module, the spare memory module to write data stored in the failed nonvolatile memory chip to non-failed nonvolatile memory chip in the one of the plurality of memory modules, with the data being restored.

2. The storage system according to claim 1, wherein the storage controller comprises an adapter for connecting to a hard disk drive, wherein each of the plurality of memory modules comprises an interface for connecting to the adapter of the storage controller.

3. The storage system according to claim 1, wherein the one of the plurality of memory modules registers a block in which a data write count or error count in each of the one or more nonvolatile memory chips of the one of the plurality of memory modules exceeds a predetermined threshold value respectively set to data write count or error count, and registers each of the one or more nonvolatile memory chips in which a registered block quantity exceeds the predetermined threshold value set to a block quantity as the failed nonvolatile memory.

4. The storage system according to claim 1, wherein one of the plurality of memory modules retains first management information for managing the spare nonvolatile memory chip existing in the one of the plurality of memory modules;

determines the another nonvolatile memory chip as the copy destination of data stored in the failed nonvolatile memory based on the first management information; and copies data stored in the failed nonvolatile memory to the nonvolatile memory chip determined as the copy destination with the data being restored if necessary.

5. The storage system according to claim 1, wherein the storage controller retains second management information for managing a spare memory module in the plurality of memory modules;

wherein one of the plurality of memory modules determines the spare memory module from the rest of the plurality of memory modules as the copy destination of data stored in the failed nonvolatile memory, and determines a particular nonvolatile memory chip in the spare memory module from the rest of the plurality of the nonvolatile memory chips based on the second management information; and copies data stored in the failed nonvolatile memory chip to the particular nonvolatile memory chip in the spare memory module with the data being restored if necessary.

6. The storage system according to claim 4, wherein the data from the host system is split with redundancy and stored in a plurality of the nonvolatile memory chips belonging to the same group; and wherein one of the plurality of memory modules retains third management information for managing a group to which each of the one or more nonvolatile memory chips in the one of the plurality of memory module belongs;

acquires necessary data from each nonvolatile memory chip belonging to the same group as the nonvolatile memory chip based on the third management information when a failure occurs to any one of the nonvolatile memory chips; and restores data stored in the failed nonvolatile memory chip based on the acquired data.

7. The storage system according to claim 6, wherein the data from the host system is split with redundancy and stored in a plurality of the one or more nonvolatile memory chips belonging to the same group; and wherein the one of the plurality of memory modules retains third management information for managing a group to which each of the one or more nonvolatile memory chips in the one of the plurality of memory modules belongs;

acquires, when a failure occurs to any one of the one or more nonvolatile memory chips, necessary data from each of the one or more nonvolatile memory chips belonging to the same group as the failed nonvolatile memory chip based on the third management information; and restores data stored in the failed nonvolatile memory chip based on the acquired data.

8. A control method for a storage system providing a storage extent for reading and writing data from and to a host system, wherein the storage system comprises:

a plurality of memory modules each including one or more nonvolatile memory chips for respectively providing the storage extent, and a memory controller configured to control reading and writing data from and to each of one or more of the nonvolatile memory chips of a corresponding of the memory modules, wherein each of the plurality of memory modules is configured to be freely attached to and detached from a baseboard main body as a unit of replacement; and a storage controller configured to control the reading and writing of data from and to each of the plurality of memory modules;

wherein the control method comprises:

a first step whereby at least one of the plurality of memory modules determines, when a failure occurs in any one of the one or more nonvolatile memory chips in the one of the plurality of memory modules, another nonvolatile memory chip among the rest of one or more of the nonvolatile memory chips of the one of the plurality of memory modules as a copy destination of data stored in the failed nonvolatile memory chip;

a second step whereby the one of the plurality of memory modules copies the data stored in the failed nonvolatile memory chip to the another nonvolatile memory chip determined as the copy destination, a third step whereby the memory controller in the one of the plurality of memory modules detects an error occurrence at each of the one or more nonvolatile memory chips of the one of the plurality of memory modules, and selects, based on whether the data stored in the failed nonvolatile memory chip is restorable or not, and whether there is a spare nonvolatile memory chip in the one of the plurality of memory modules or not one processing to request a copy correction, in which the memory controller in the one of the plurality of memory modules including the failed nonvolatile memory chip requests to a memory controller in a spare memory module, which belongs to a same group as the one of the plurality of memory modules, to restore and copy data stored in the failed nonvolatile memory chip to a nonvolatile memory chip of the spare memory module, or another processing to request a dynamic sparing, in which the memory controller in the one of the plurality of memory modules including the failed nonvolatile memory chip requests, to a memory controller in the spare memory module, the spare memory module to write data stored in the failed nonvolatile memory chip to a non-failed nonvolatile memory chip in the one of the plurality of memory modules, with the data is being restored.

9. The control method according to claim 8,
wherein the one of the plurality of memory modules
registers a block in which a data write count or error count in each of the one or more nonvolatile memory chips of the one of the plurality of memory modules exceeds a predetermined threshold value respectively set to the data write count or error count, and registers each of the one or more nonvolatile memory chips in which the registered block quantity exceeds the predetermined threshold value set to a block quantity as the failed nonvolatile memory.

10. The control method according to claim 8,
wherein the one of the plurality of memory modules retains first management information for managing the spare nonvolatile memory chip existing in the one of the plurality of memory modules;
wherein, in the first step, the memory module determines the another nonvolatile memory chip as the copy destination of data stored in the failed nonvolatile memory based on the first management information; and
wherein, in the second step, the memory module copies data stored in the failed nonvolatile memory to the another nonvolatile memory chip determined as the copy destination with the data being restored if necessary.

11. The control method according to claim 8,
wherein the storage controller retains second management information for managing the spare memory module;
wherein, in the first step, the one of the plurality of memory modules determines the spare memory module from the rest of the plurality of memory modules as the copy destination of data stored in the failed nonvolatile memory and determines a particular nonvolatile memory chip in the spare memory module from the rest of the plurality of the nonvolatile memory chips based on the second management information; and
wherein, in the second step, the memory module copies data stored in the failed nonvolatile memory chip to the particular nonvolatile memory chip in the spare memory module with the data being restored if necessary.

12. The control method according to claim 10,
wherein the data from the host system is split with redundancy and stored in a plurality of the nonvolatile memory chips belonging to the same group;
wherein the one of the plurality of memory modules retains third management information for managing a group to which each of the nonvolatile memory chips in the one of the plurality of memory modules belongs; and
wherein in the second step, the one of the plurality of memory modules acquires necessary data from each of the nonvolatile memory chips belonging to the same group as the nonvolatile memory chip based on the third management information when a failure occurs to any one of the one or more nonvolatile memory chips; and restores data stored in the failed nonvolatile memory chip based on the acquired data.

13. The control method according to claim 12,
wherein the data from the host system is split with redundancy and stored in a plurality of the nonvolatile memory chips belonging to the same group;
wherein the one of the plurality of memory modules retains third management information for managing a group to which each of the nonvolatile memory chips in the one of the plurality memory modules belongs; and
wherein in the second step, the memory module acquires, when a failure occurs to any one of the nonvolatile memory chips, necessary data from each of the nonvolatile memory chips belonging to the same group as the failed nonvolatile memory chip based on the third management information; restores data stored in the failed nonvolatile memory chip based on the acquired data.

* * * * *